US012200552B2

(12) United States Patent
Sun et al.

(10) Patent No.: US 12,200,552 B2
(45) Date of Patent: Jan. 14, 2025

(54) COMMUNICATION METHOD AND APPARATUS

(71) Applicant: HUAWEI TECHNOLOGIES CO., LTD., Shenzhen (CN)

(72) Inventors: Huiming Sun, Shanghai (CN); Xingxing Hu, Shanghai (CN); Hongping Zhang, Shenzhen (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/939,456

(22) Filed: Sep. 7, 2022

(65) Prior Publication Data

US 2023/0007552 A1 Jan. 5, 2023

Related U.S. Application Data

(63) Continuation of application No. PCT/CN2021/077851, filed on Feb. 25, 2021.

(30) Foreign Application Priority Data

Mar. 9, 2020 (CN) .......................... 202010158453.2

(51) Int. Cl.
  *H04W 36/00* (2009.01)
  *H04W 36/08* (2009.01)
(52) U.S. Cl.
  CPC . *H04W 36/00835* (2018.08); *H04W 36/0069* (2018.08); *H04W 36/08* (2013.01)
(58) Field of Classification Search
  CPC ....... H04W 36/00835; H04W 36/0069; H04W 36/08
  See application file for complete search history.

(56) References Cited

U.S. PATENT DOCUMENTS 9,980,309 B2 *  5/2018  Kim ................. H04W 36/0058
2010/0274921 A1  10/2010  Lerzer et al.
2022/0369173 A1  11/2022  Deng

FOREIGN PATENT DOCUMENTS

CN       104822169 A      8/2015
CN       105451364 A      3/2016
(Continued)

OTHER PUBLICATIONS

3GPP TSG-RAN WG2 #107, R2-1909144, Reuse of conditional handover for SCG change in NR-DC , NEC,Prague, Czech Republic, Aug. 26-30, 2019, total 3 pages.
(Continued)

*Primary Examiner* — Kevin Kim
(74) *Attorney, Agent, or Firm* — HAUPTMAN HAM, LLP

(57) ABSTRACT

A method includes receiving a first message from a first master node. The first message includes an identifier of a first candidate primary secondary cell (PSCell) or an identifier of first configuration information of the first candidate PSCell. The first candidate PSCell is included in both a first PSCell list and a second PSCell list. Alternatively, the first message includes delta configuration information of a second candidate PSCell in the second PSCell list. The first configuration information of the first candidate PSCell includes an addition/change condition and a configuration of the first candidate PSCell. The first PSCell list includes one or more candidate PSCells configured by the first master node for a terminal. The second PSCell list includes one or more candidate PSCells configured by a second master node for the terminal. The method also includes adding a target PSCell or changing from an original PSCell to the target PSCell.

19 Claims, 8 Drawing Sheets

(56) References Cited

FOREIGN PATENT DOCUMENTS

| CN | 110545567 A | 12/2019 |
|---|---|---|
| CN | 110546992 A | 12/2019 |

OTHER PUBLICATIONS

3GPP TSG-RAN WG2 Meeting #107,R2-1911344,Support of Conditional PSCell addition/change,NTT Docomo, Inc., Nokia, Ericsson, Fujitsu, KT Corp, Media Tek Inc., NEC, Qualcomm Inc., SoftBank Corp.Prague, Czech, Aug. 26-30, 2019,total 3 pages.
International Search Report issued in corresponding International Application No. PCT/CN2021/077851, dated May 14, 2021, pp. 1-10.
Ericsson, Major CHO issues not discussed in [108#66][NR Mob]. 3GPP TSG-RAN WG2 #109-e, Electronic meeting, Feb. 24-Mar. 6, 2020, R2-2000330, 8 pages.
China Telecom, Stage-2 CR for introduction of even further mobility enhancement in E-UTRAN. 3GPP TSG-RAN2 Meeting #109, Athens, Greece, Feb. 24-28, 2020, R2-2001653, 35 pages.
Huawei, Handling of SCG configuration during handover without SN change over Xn. 3GPP TSG-RAN3 Meeting #104, Reno, Nevada, US, May 13-17, 2019, R3-192579, 23 pages.
3GPP TS 36.331 V16.0.0 (Mar. 2020), 3rd Generation Partnership Project; Technical Specification Group Radio Access Network; Evolved Universal Terrestrial Radio Access (E-UTRA); Radio Resource Control (RRC); Protocol specification (Release 16), 1048 pages.
Extended European Search Report issued in corresponding European Application No. 21767239.3, dated Apr. 26, 2023, pp. 1-15.

\* cited by examiner

COMMUNICATION METHOD AND APPARATUS

CROSS-REFERENCE TO RELATED APPLICATIONS

This application is a continuation of International Patent Application No. PCT/CN2021/077851, filed on Feb. 25, 2021, which claims priority to Chinese Application No. 202010158453.2, filed on Mar. 9, 2020. The disclosures of the aforementioned applications are hereby incorporated by reference in their entireties.

TECHNICAL FIELD

Embodiments of this application relate to the wireless communication field, and in particular, to a communication method and apparatus.

BACKGROUND

In the field of wireless communication technologies, to improve a throughput of a user, a dual connectivity (DC) technology is introduced. DC can support two or more base stations in simultaneously providing data transmission services for one terminal. These base stations include one master base station and one or more secondary base stations. The master base station may establish a radio resource control (RRC) connection to the terminal, and may transmit an RRC message to the terminal. The master base station further establishes a control plane connection to a core network. Some RRC messages may be transmitted between the secondary base station and the terminal, where the some RRC messages include measurement configuration information used to measure signal quality of a cell, a measurement report, or the like.

After establishing the RRC connection to the master base station, the terminal may perform conditional primary secondary cell (PSCell) addition (conditional PSCell addition, CPA), to establish a connection to the secondary base station. After establishing the connections to both the master base station and the secondary base station, the terminal may further perform conditional PSCell change (CPC), to change a PSCell connected to the terminal. However, when a terminal having a conditional PSCell addition/change (CPAC) configuration performs master base station handover, for example, the terminal is handed over from a current master base station to a target master base station with better signal quality, air interface overheads for performing CPAC by the target master base station and the terminal are high.

SUMMARY

Embodiments of this application provide a communication method and apparatus, so that after a terminal performs master base station handover, air interface overheads for performing CPAC by a target master base station and the terminal can be reduced.

To achieve the foregoing objective, the following technical solutions are used in embodiments of this application.

According to a first aspect, an embodiment of this application provides a communication method. The method includes: A terminal receives a first message from a first master node, where the first message includes an identifier of a first candidate PSCell or an identifier of configuration information of the first candidate PSCell, where the first candidate PSCell is included in both a first PSCell list and a second PSCell list; or the first message includes delta configuration information of a candidate PSCell in the second PSCell list, where the configuration information of the first candidate PSCell includes an addition/change condition and a configuration of the first candidate PSCell, the first PSCell list includes one or more candidate PSCells configured by the first master node for the terminal, and the second PSCell list includes one or more candidate PSCells configured by a second master node for the terminal. The terminal adds a target PSCell or changes from an original PSCell to the target PSCell based on the first message and first configuration information, where the first configuration information includes an addition/change condition and a configuration of the candidate PSCell in the first PSCell list, the target PSCell is a PSCell in the second PSCell list, and the original PSCell is a PSCell to which the terminal is connected before the terminal is handed over from the first master node to the second master node.

According to the method in the first aspect, the terminal may receive the first message from the first master node, and add the target PSCell or change from the original PSCell to the target PSCell based on the first message and the first configuration information. A size of the identifier or the information included in the first message is less than a size of configuration information of the candidate PSCell in the second PSCell list. Therefore, air interface overheads for performing CPAC by the second master node and the terminal can be reduced.

With reference to the first aspect, in a possible implementation, the delta configuration information includes different configuration information in configuration information of a same candidate PSCell configured by the second master node and the first master node for the terminal, and/or configuration information of each candidate PSCell other than the first candidate PSCell in the second PSCell list, and/or an identifier of configuration information of a candidate PSCell that is in the first PSCell list and that the second master node determines to release. Based on the foregoing method, the first message may not include full configuration information of the candidate PSCell in the second PSCell list, but includes the delta configuration information. Therefore, air interface overheads for performing CPAC by the second master node and the terminal can be reduced.

With reference to the first aspect and the foregoing possible implementation, in a possible implementation, that the terminal adds a target PSCell or changes from an original PSCell to the target PSCell based on the first message and first configuration information includes: The terminal determines second configuration information based on the first message and the first configuration information, where the second configuration information includes an addition/change condition and a configuration of the candidate PSCell in the second PSCell list; and the terminal adds a PSCell that meets the addition/change condition of the candidate PSCell in the second PSCell list as the target PSCell or changes from the original PSCell to the target PSCell based on the second configuration information. Based on the foregoing method, the terminal may restore the second configuration information based on the first message and the first configuration information, and add the PSCell that meets the addition condition of the candidate PSCell, or change from the original PSCell to the PSCell that meets the change condition of the candidate PSCell, based on the second configuration information. In this way, the first master node may not need to send the second configuration information to the terminal, thereby reducing air interface overheads for performing CPAC by the second master node and the terminal.

With reference to the first aspect and the foregoing possible implementation, in a possible implementation, the first message includes delta configuration information of the candidate PSCell in the second PSCell list. That the terminal determines second configuration information based on the first message and the first configuration information includes: The terminal determines the second configuration information based on the delta configuration information and the first configuration information. Based on the foregoing method, the terminal may restore the second configuration information based on the delta configuration information and the first configuration information. In this way, the first master node may not need to send the second configuration information to the terminal, thereby reducing air interface overheads for performing CPAC by the second master node and the terminal.

With reference to the first aspect and the foregoing possible implementation, in a possible implementation, the first message includes the identifier of the first candidate PSCell or the identifier of the configuration information of the first candidate PSCell. That the terminal determines second configuration information based on the first message and the first configuration information includes: The terminal determines the first configuration information corresponding to the identifier of the first candidate PSCell or the identifier of the configuration information of the first candidate PSCell as the second configuration information. Based on the foregoing method, when the second PSCell list is included in the first PSCell list, or the second PSCell list is the same as the first PSCell list, the terminal may determine the first configuration information corresponding to the identifier of the first candidate PSCell or the identifier of the configuration information of the first candidate PSCell as the second configuration information. In this way, the first master node may not need to send the second configuration information to the terminal, thereby reducing air interface overheads for performing CPAC by the second master node and the terminal.

With reference to the first aspect and the foregoing possible implementation, in a possible implementation, the first configuration information further includes configuration information of the original PSCell, and the delta configuration information includes configuration information that is of any candidate PSCell in the second PSCell list and that is different from the configuration information of the original PSCell. Based on the foregoing method, the first message may not include full configuration information of the candidate PSCell in the second PSCell list, but includes the delta configuration information. Therefore, air interface overheads for performing CPAC by the second master node and the terminal can be reduced.

According to a second aspect, an embodiment of this application provides a communication method. The method includes: A first master node sends a first message to a second master node, where the first message is used to indicate first configuration information of a candidate PSCell in a first PSCell list, the first configuration information includes an addition/change condition and a configuration of the candidate PSCell in the first PSCell list, the first PSCell list includes one or more candidate PSCells configured by the first master node for a terminal, and the second master node is a target master node to which the terminal is handed over. The first master node receives a second message from the second master node, where the second message is obtained based on the first message, and the second message includes an identifier of a first candidate PSCell or an identifier of configuration information of the first candidate PSCell, where the first candidate PSCell is included in both the first PSCell list and a second PSCell list; or the second message includes delta configuration information of a candidate PSCell in the second PSCell list, where the configuration information of the first candidate PSCell includes an addition/change condition and a configuration of the first candidate PSCell, and the second PSCell list includes one or more candidate PSCells configured by the second master node for the terminal. The first master node sends a third message to the terminal based on the second message, where the third message includes the identifier of the first candidate PSCell, or the identifier of the configuration information of the first candidate PSCell, or the delta configuration information of the candidate PSCell in the second PSCell list.

According to the method in the second aspect, the first master node may send, to the second master node, the first message used to indicate the first configuration information of the candidate PSCell in the first PSCell list, and receive the second message from the second master node. A size of the identifier or the information included in the second message is less than a size of configuration information of the candidate PSCell in the second PSCell list. Therefore, communication overheads of the first master node and the second master node can be reduced.

With reference to the second aspect, in a possible implementation, the delta configuration information includes different configuration information in configuration information of a same candidate PSCell configured by the second master node and the first master node for the terminal, and/or configuration information of each candidate PSCell other than the first candidate PSCell in the second PSCell list, and/or an identifier of configuration information of a candidate PSCell that is in the first PSCell list and that the second master node determines to release. Based on the foregoing method, the second message may not include full configuration information of the candidate PSCell in the second PSCell list, but includes the delta configuration information. Therefore, communication overheads of the first master node and the second master node can be reduced.

With reference to the second aspect and the foregoing possible implementation, in a possible implementation, the method further includes: The first master node sends a first release request message to a node to which each candidate PSCell in the first PSCell list belongs, where the first release request message is used to request to release each candidate PSCell in the first PSCell list. Based on the foregoing method, after determining that the terminal is to be handed over to the second master node, the first master node may indicate a node to which each candidate PSCell in the first PSCell list belongs to release the candidate PSCell configured by the first master node for the terminal. In this way, the node to which each candidate PSCell in the first PSCell list belongs may configure the released candidate PSCell for another terminal, thereby saving communication resources.

With reference to the second aspect and the foregoing possible implementation, in a possible implementation, when the first PSCell list includes the first candidate PSCell, the first release request message is further used to indicate a node to which the first candidate PSCell belongs to retain a context with the terminal. Based on the foregoing method, when the second master node configures the first candidate PSCell as a candidate PSCell for the terminal, the first candidate secondary node does not need to regenerate the context with the terminal. Subsequently, if the first candidate PSCell is determined as the target PSCell, the first candidate secondary node may communicate with the terminal by using the retained context.

With reference to the second aspect and the foregoing possible implementations, in a possible implementation, the first message includes configuration information of the candidate PSCell in the first PSCell list; the first message includes an identifier of the candidate PSCell in the first PSCell list; or the first message includes an identifier of a secondary cell group to which the candidate PSCell in the first PSCell list belongs. Based on the foregoing method, the first master node may indicate the first configuration information of the candidate PSCell in the first PSCell list by using the configuration information of the candidate PSCell in the first PSCell list, or the identifier of the candidate PSCell in the first PSCell list, or the identifier of the secondary cell group to which the candidate PSCell in the first PSCell list belongs. This improves diversity of indicating, by the first master node, the first configuration information of the candidate PSCell in the first PSCell list.

With reference to the second aspect and the foregoing possible implementation, in a possible implementation, the first message further includes an identifier of an original PSCell, and the original PSCell is a PSCell to which the terminal is connected before the terminal is handed over from the first master node to the second master node. Based on the foregoing method, the first master node may further indicate the original PSCell to the second master node, so that the second master node determines to add the original PSCell or add another PSCell for the terminal.

With reference to the second aspect and the foregoing possible implementation, in a possible implementation, the delta configuration information includes configuration information that is of any candidate PSCell in the second PSCell list and that is different from configuration information of the original PSCell. Based on the foregoing method, the second message may not include full configuration information of the candidate PSCell in the second PSCell list, but includes the delta configuration information. Therefore, communication overheads of the first master node and the second master node can be reduced.

According to a third aspect, an embodiment of this application provides a communication method. The method includes: A second master node receives a first message from a first master node, where the first message is used to indicate first configuration information of a candidate PSCell in a first PSCell list, the first configuration information includes an addition/change condition and a configuration of the candidate PSCell in the first PSCell list, the first PSCell list includes one or more candidate PSCells configured by the first master node for a terminal, and the second master node is a target master node to which the terminal is handed over. The second master node determines, based on the first message, that the first master node configures a conditional PSCell addition/change function for the terminal, and sends a second message to the first master node, where the second message includes an identifier of a first candidate PSCell or an identifier of configuration information of the first candidate PSCell, where the first candidate PSCell is included in both the first PSCell list and a second PSCell list; or the second message includes delta configuration information of a candidate PSCell in the second PSCell list, where the configuration information of the first candidate PSCell includes an addition/change condition and a configuration of the first candidate PSCell, and the second PSCell list includes one or more candidate PSCells configured by the second master node for the terminal.

According to the method in the third aspect, when receiving, from the first master node, the first message used to indicate the first configuration information of the candidate PSCell in the first PSCell list, the second master node may determine that the first master node configures a conditional PSCell addition/change function for the terminal, and send the second message to the first master node. A size of the identifier or the information included in the second message is less than a size of configuration information of the candidate PSCell in the second PSCell list. Therefore, communication overheads of the second master node and the first master node can be reduced.

With reference to the third aspect, in a possible implementation, the delta configuration information includes different configuration information in configuration information of a same candidate PSCell configured by the second master node and the first master node for the terminal, and configuration information of each candidate PSCell other than the first candidate PSCell in the second PSCell list, and/or an identifier of configuration information of a candidate PSCell that is in the first PSCell list and that the second master node determines to release. Based on the foregoing method, the second message may not include full configuration information of the candidate PSCell in the second PSCell list, but includes the delta configuration information. Therefore, communication overheads of the first master node and the second master node can be reduced.

With reference to the third aspect and the foregoing possible implementations, in a possible implementation, the first message includes configuration information of the candidate PSCell in the first PSCell list; the first message includes an identifier of the candidate PSCell in the first PSCell list; or the first message includes an identifier of a secondary cell group to which the candidate PSCell in the first PSCell list belongs. Based on the foregoing method, the second master node may determine the first configuration information of the candidate PSCell in the first PSCell list based on the configuration information of the candidate PSCell in the first PSCell list, so that the second master node determines the configuration information of the candidate PSCell in the second PSCell list based on the first configuration information of the candidate PSCell in the first PSCell list; or the second master node may determine the candidate PSCell in the first PSCell list by using the identifier of the candidate PSCell in the first PSCell list or the identifier of the secondary cell group to which the candidate PSCell in the first PSCell list belongs, so that the second master node determines the candidate PSCell in the second PSCell list based on the identifier.

With reference to the third aspect and the foregoing possible implementation, in a possible implementation, the first message further includes an identifier of an original PSCell, and the original PSCell is a PSCell to which the terminal is connected before the terminal is handed over from the first master node to the second master node. Based on the foregoing method, the second master node may determine, by using the identifier of the original PSCell in the first message, that the first master node adds the original PSCell for the terminal. Subsequently, the second master node may add the original PSCell or another PSCell for the terminal.

With reference to the third aspect and the foregoing possible implementation, in a possible implementation, the delta configuration information includes configuration information that is of any candidate PSCell in the second PSCell list and that is different from configuration information of the original PSCell. Based on the foregoing method, the second message may not include full configuration information of the candidate PSCell in the second PSCell list, but includes the delta configuration information. Therefore, communication overheads of the first master node and the second master node can be reduced.

According to a fourth aspect, an embodiment of this application provides a communication method. The method includes: A first candidate secondary node receives a first release request message from a first master node, where the first release request message is used to request to release a candidate PSCell configured by the first candidate secondary node for the first master node, and is used to indicate the first candidate secondary node to retain a context with a terminal, the first candidate secondary node is a node to which a first candidate PSCell that is included in both a first PSCell list and a second PSCell list belongs, the first PSCell list includes one or more candidate PSCells configured by the first master node for the terminal, the second PSCell list includes one or more candidate PSCells configured by a second master node for the terminal, and the second master node is a target master node to which the terminal is handed over. The first candidate secondary node releases, based on the first release request message, the PSCell configured by the first candidate secondary node for the first master node, and retains the context between the first candidate secondary node and the terminal.

According to the method in the fourth aspect, after receiving the first release request message from the first master node, the first candidate secondary node may release the PSCell configured by the first candidate secondary node for the first master node. In this way, the first candidate secondary node may configure the released PSCell for another terminal, thereby saving communication resources.

With reference to the fourth aspect, in a possible implementation, the first release request message includes an identifier of the first candidate secondary node or an identifier of the PSCell of the first candidate secondary node. Based on the foregoing method, the first candidate secondary node may release, based on the identifier of the first candidate secondary node or the identifier of the PSCell of the first candidate secondary node, the PSCell configured by the first candidate secondary node for the first master node.

According to a fifth aspect, an embodiment of this application provides a communication apparatus, to implement the method in any one of the first aspect or the possible implementations of the first aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to a sixth aspect, an embodiment of this application provides a communication apparatus, to implement the method in any one of the second aspect or the possible implementations of the second aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a seventh aspect, an embodiment of this application provides a communication apparatus, to implement the method in any one of the third aspect or the possible implementations of the third aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to an eighth aspect, an embodiment of this application provides a communication apparatus, to implement the method in any one of the fourth aspect or the possible implementations of the fourth aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a ninth aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the first aspect or the possible implementations of the first aspect.

According to a tenth aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the second aspect or the possible implementations of the second aspect.

According to an eleventh aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the third aspect or the possible implementations of the third aspect.

According to a twelfth aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the fourth aspect or the possible implementations of the fourth aspect.

According to a thirteenth aspect, an embodiment of this application provides a communication apparatus. The apparatus is configured to implement the method in any one of the first aspect or the possible implementations of the first aspect.

According to a fourteenth aspect, an embodiment of this application provides a communication apparatus. The apparatus is configured to implement the method in any one of the second aspect or the possible implementations of the second aspect.

According to a fifteenth aspect, an embodiment of this application provides a communication apparatus. The apparatus is configured to implement the method in any one of the third aspect or the possible implementations of the third aspect.

According to a sixteenth aspect, an embodiment of this application provides a communication apparatus. The apparatus is configured to implement the method in any one of the fourth aspect or the possible implementations of the fourth aspect.

According to a seventeenth aspect, an embodiment of this application provides a computer-readable medium, storing a computer program or instructions. When the computer program or the instructions are executed, a computer is enabled to perform the method in any one of the first aspect or the possible implementations of the first aspect.

According to an eighteenth aspect, an embodiment of this application provides a computer-readable medium, storing a computer program or instructions. When the computer program or the instructions are executed, a computer is enabled to perform the method in any one of the second aspect or the possible implementations of the second aspect.

According to a nineteenth aspect, an embodiment of this application provides a computer-readable medium, storing a computer program or instructions. When the computer program or the instructions are executed, a computer is enabled to perform the method in any one of the third aspect or the possible implementations of the third aspect.

According to a twentieth aspect, an embodiment of this application provides a computer-readable medium, storing a computer program or instructions. When the computer program or the instructions are executed, a computer is enabled to perform the method in any one of the fourth aspect or the possible implementations of the fourth aspect.

According to a twenty-first aspect, an embodiment of this application provides a computer program product, including computer program code. When the computer program code is run a computer, the computer is enabled to perform the method in any one of the first aspect or the possible implementations of the first aspect.

According to a twenty-second aspect, an embodiment of this application provides a computer program product, including computer program code. When the computer program code is run a computer, the computer is enabled to perform the method in any one of the second aspect or the possible implementations of the second aspect.

According to a twenty-third aspect, an embodiment of this application provides a computer program product, including computer program code. When the computer program code is run a computer, the computer is enabled to perform the method in any one of the third aspect or the possible implementations of the third aspect.

According to a twenty-fourth aspect, an embodiment of this application provides a computer program product, including computer program code. When the computer program code is run a computer, the computer is enabled to perform the method in any one of the fourth aspect or the possible implementations of the fourth aspect.

According to a twenty-fifth aspect, an embodiment of this application provides a chip, including a processor. The processor is coupled to a memory, the memory is configured to store a program or instructions, and when the program or the instructions are executed by the processor, the chip is enabled to implement the method in any one of the first aspect or the possible implementations of the first aspect.

According to a twenty-sixth aspect, an embodiment of this application provides a chip, including a processor. The processor is coupled to a memory, the memory is configured to store a program or instructions, and when the program or the instructions are executed by the processor, the chip is enabled to implement the method in any one of the second aspect or the possible implementations of the second aspect.

According to a twenty-seventh aspect, an embodiment of this application provides a chip, including a processor. The processor is coupled to a memory, the memory is configured to store a program or instructions, and when the program or the instructions are executed by the processor, the chip is enabled to implement the method in any one of the third aspect or the possible implementations of the third aspect.

According to a twenty-eighth aspect, an embodiment of this application provides a chip, including a processor. The processor is coupled to a memory, the memory is configured to store a program or instructions, and when the program or the instructions are executed by the processor, the chip is enabled to implement the method in any one of the fourth aspect or the possible implementations of the fourth aspect.

According to a twenty-ninth aspect, an embodiment of this application provides a communication system. The system includes the apparatus according to the fifth aspect, and/or the apparatus according to the sixth aspect, and/or the apparatus according to the seventh aspect, and/or the apparatus according to the eighth aspect, or the system includes the apparatus according to the ninth aspect, and/or the apparatus according to the tenth aspect, and/or the apparatus according to the eleventh aspect, and/or the apparatus according to the twelfth aspect, or the system includes the apparatus according to the thirteenth aspect, and/or the apparatus according to the fourteenth aspect, and/or the apparatus according to the fifteenth aspect, and/or the apparatus according to the sixteenth aspect.

It may be understood that any communication apparatus, chip, computer-readable medium, computer program product, or communication system, or the like provided above is configured to perform a corresponding method provided above. Therefore, for beneficial effects that can be achieved by the communication apparatus, the chip, the computer-readable medium, the computer program product, the communication system, or the like, refer to beneficial effects in the corresponding method. Details are not described herein again.

According to a thirtieth aspect, an embodiment of this application provides a communication method. The method includes: A terminal obtains first configuration information of a target PSCell, where the first configuration information includes configuration information of the target PSCell that is used when a master node configures the target PSCell as a candidate PSCell for the terminal. The terminal receives a first message from the master node, where the first message includes an identifier of the target PSCell or an identifier of a secondary cell group to which the target PSCell belongs. The terminal determines second configuration information of the target PSCell based on the first message and the first configuration information, where the second configuration information includes configuration information of the target PSCell that is used when the master node determines the target PSCell as a PSCell for the terminal. The terminal establishes, based on the second configuration information, a connection to a secondary node to which the target PSCell belongs.

According to the method in the thirtieth aspect, the terminal may obtain the first configuration information of the target PSCell; when receiving the first message from the master node, the terminal knows that the master node adds the target PSCell for the terminal; and the terminal may determine the second configuration information of the target PSCell by using the identifier in the first message, and apply the second configuration information.

With reference to the thirtieth aspect, in a possible implementation, if the second configuration information is different from the first configuration information, the first message further includes a delta configuration of the target PSCell, and the delta configuration includes different configuration information in the first configuration information and the second configuration information. Based on the foregoing method, if the second configuration information is different from the first configuration information, the first message may include the delta configuration of the target PSCell instead of including a full configuration of the target PSCell. In this way, air interface overheads of the master node and the terminal can be reduced.

According to a thirty-first aspect, an embodiment of this application provides a communication method. The method includes: A master node sends first configuration information of a target PSCell to a terminal, where the first configuration information includes configuration information of the target PSCell that is used when the master node configures the target PSCell as a candidate PSCell for the terminal. The master node sends a first message to the terminal, where the first message includes an identifier of the target PSCell or an identifier of a secondary node to which the target PSCell belongs, the first message is used with the first configuration information to determine second configuration information of the target PSCell, and the second configuration information includes configuration information of the target PSCell that is used when the master node determines the target PSCell as a PSCell for the terminal.

According to the method provided in the thirty-first aspect, the master node may send the first configuration information of the target PSCell to the terminal, and send the first message to the terminal after adding the target PSCell for the terminal, so that the terminal determines the second configuration information of the target PSCell by using the identifier in the first message, and applies the second configuration information.

With reference to the thirty-first aspect, in a possible implementation, if the second configuration information is different from the first configuration information, the first message further includes a delta configuration of the target PSCell, and the delta configuration includes different configuration information in the first configuration information and the second configuration information. Based on the foregoing method, if the second configuration information is different from the first configuration information, the first message may include the delta configuration of the target PSCell instead of including a full configuration of the target PSCell. In this way, air interface overheads of the master node and the terminal can be reduced.

According to a thirty-second aspect, an embodiment of this application provides a communication apparatus. The communication apparatus includes a processing unit and a receiving unit. The processing unit is configured to obtain first configuration information of a target PSCell, where the first configuration information includes configuration information of the target PSCell that is used when a master node configures the target PSCell as a candidate PSCell for the terminal. The receiving unit is configured to receive a first message from the master node, where the first message includes an identifier of the target PSCell or an identifier of a secondary cell group to which the target PSCell belongs. The processing unit is further configured to determine second configuration information of the target PSCell based on the first message and the first configuration information, where the second configuration information includes configuration information of the target PSCell that is used when the master node determines the target PSCell as a PSCell for the terminal. The processing unit is further configured to establish, based on the second configuration information, a connection to a secondary node to which the target PSCell belongs.

With reference to the thirty-second aspect, in a possible implementation, if the second configuration information is different from the first configuration information, the first message further includes a delta configuration of the target PSCell, and the delta configuration includes different configuration information in the first configuration information and the second configuration information.

According to a thirty-third aspect, an embodiment of this application provides a communication apparatus. The communication apparatus includes a sending unit. The sending unit is configured to send first configuration information of a target PSCell to a terminal, where the first configuration information includes configuration information of the target PSCell that is used when the master node configures the target PSCell as a candidate PSCell for the terminal. The sending unit is further configured to send a first message to the terminal, where the first message includes an identifier of the target PSCell or an identifier of a secondary node to which the target PSCell belongs, the first message is used with the first configuration information to determine second configuration information of the target PSCell, and the second configuration information includes configuration information of the target PSCell that is used when the master node determines the target PSCell as a PSCell for the terminal.

With reference to the thirty-third aspect, in a possible implementation, if the second configuration information is different from the first configuration information, the first message further includes a delta configuration of the target PSCell, and the delta configuration includes different configuration information in the first configuration information and the second configuration information.

According to a thirty-fourth aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the thirtieth aspect or the possible implementations of the thirtieth aspect.

According to a thirty-fifth aspect, an embodiment of this application provides a communication apparatus, including a processor. The processor is coupled to a memory, the memory is configured to store a program or instructions, and when the program or the instructions are executed by the processor, the apparatus is enabled to implement the method in any one of the thirty-first aspect or the possible implementations of the thirty-first aspect.

According to a thirty-sixth aspect, an embodiment of this application provides a communication apparatus. The apparatus is configured to implement the method in any one of the thirtieth aspect or the possible implementations of the thirtieth aspect.

According to a thirty-seventh aspect, an embodiment of this application provides a communication apparatus. The apparatus is configured to implement the method in any one of the thirty-first aspect or the possible implementations of the thirty-first aspect.

According to a thirty-eighth aspect, an embodiment of this application provides a computer-readable medium, storing a computer program or instructions. When the computer program or the instructions are executed, a computer is enabled to perform the method in any one of the thirtieth aspect or the possible implementations of the thirtieth aspect.

According to a thirty-ninth aspect, an embodiment of this application provides a computer-readable medium, storing a computer program or instructions. When the computer program or the instructions are executed, a computer is enabled to perform the method in any one of the thirty-first aspect or the possible implementations of the thirty-first aspect.

According to a fortieth aspect, an embodiment of this application provides a computer program product, including computer program code. When the computer program code is run a computer, the computer is enabled to perform the method in any one of the thirtieth aspect or the possible implementations of the thirtieth aspect.

According to a forty-first aspect, an embodiment of this application provides a computer program product, including computer program code. When the computer program code is run a computer, the computer is enabled to perform the method in any one of the thirty-first aspect or the possible implementations of the thirty-first aspect.

According to a forty-second aspect, an embodiment of this application provides a chip, including a processor. The processor is coupled to a memory, the memory is configured to store a program or instructions, and when the program or the instructions are executed by the processor, the chip is enabled to implement the method in any one of the thirtieth aspect or the possible implementations of the thirtieth aspect.

According to a forty-third aspect, an embodiment of this application provides a chip, including a processor. The processor is coupled to a memory, the memory is configured to store a program or instructions, and when the program or the instructions are executed by the processor, the chip is enabled to implement the method in any one of the thirty-first aspect or the possible implementations of the thirty-first aspect.

According to a forty-fourth aspect, an embodiment of this application provides a communication system. The system includes the apparatus according to the thirty-second aspect and/or the apparatus according to the thirty-third aspect, or the system includes the apparatus according to the thirty-fourth aspect and/or the apparatus according to the thirty-fifth aspect, or the system includes the apparatus according to the thirty-sixth aspect and/or the apparatus according to the thirty-seventh aspect.

It may be understood that any communication apparatus, chip, computer-readable medium, computer program product, or communication system, or the like provided above is configured to perform a corresponding method provided above. Therefore, for beneficial effects that can be achieved by the communication apparatus, the chip, the computer-readable medium, the computer program product, the communication system, or the like, refer to beneficial effects in the corresponding method. Details are not described herein again.

DESCRIPTION OF EMBODIMENTS

The following describes implementations of embodiments of this application in detail with reference to the accompanying drawings.

A method provided in embodiments of this application may be applied to various multi-RAT dual connectivity (MR-DC) architectures, for example, dual connectivity between a 4th generation (4G) communication system and a 5th generation (5G) communication system, dual connectivity between a 5G communication system and a 4G communication system, or dual connectivity between 5G communication systems.

Dual connectivity between the 4G communication system and the 5G communication system may include dual connectivity (E-UTRA-NR dual connectivity, EN-DC) between an evolved universal terrestrial radio access (E-UTRA) system and a new radio (NR) system, dual connectivity (NG-RAN E-UTRA-NR dual connectivity, NGEN-DC) between an E-UTRA system and an NR system in a 5G core network, and the like. EN-DC may also be referred to as an option 3 series EN-DC is a DC in which a long term evolution (long term evolution, LTE) base station such as an eNB serves as a master node (MN) or a master base station, and an NR base station such as a gNB serves as a secondary node (SN) or a secondary base station. In addition, the MN and the SN each may have a data plane connection to an evolved packet core (EPC) network, namely, a 4G core network, to provide an air interface transmission resource for data between a terminal and an EPC. NGEN-DC may also be referred to as an option 7 series. NGEN-DC is DC in which an LTE base station such as an ng-eNB serves as an MN, and an NR base station such as a gNB serves as an SN. A difference from EN-DC lies in that in NGEN-DC, both the MN and the SN are connected to a 5G core network (5GC), to provide an air interface transmission resource for data between a terminal and the 5GC.

Dual connectivity between the 5G communication system and the 4G communication system may include dual connectivity (NR-E-UTRA dual connectivity, NE-DC) between an NR system and an E-UTRA system, and the like. NE-DC may also be referred to as an option 4 series. In NE-DC, an NR base station such as a gNB serves as an MN, and an LTE base station such as an ng-eNB serves as an SN. In addition, the MN and the SN each may have a data plane connection to a 5GC, to provide an air interface transmission resource for data between a terminal and the 5GC.

Dual connectivity between the 5G communication systems may include DC between NR systems. In DC between the NR systems, both an MN and an SN are NR base stations.

Figure 1:
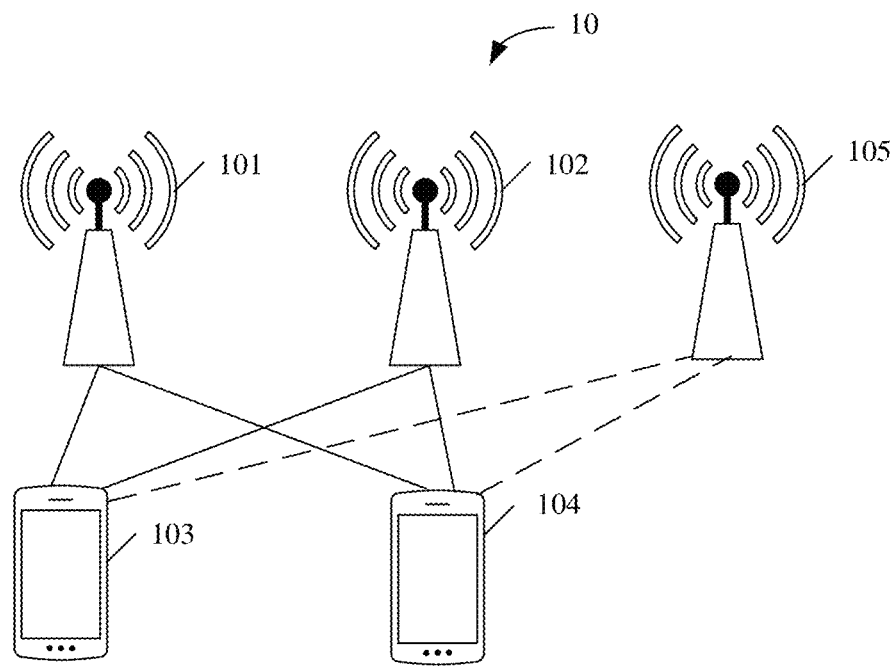
FIG. 1 is a schematic diagram of an architecture of a communication system according to an embodiment of this application.

The following uses only a communication system 10 shown in FIG. 1 as an example to describe the method provided in embodiments of this application.

FIG. 1 is a schematic diagram of an architecture of the communication system 10 according to an embodiment of this application. In FIG. 1, the communication system 10 may include a network device 101, a network device 102, a network device 105, a terminal 103, and a terminal 104. FIG. 1 is merely a schematic diagram, and does not constitute a limitation on an applicable scenario of the technical solutions provided in this application.

The network device in FIG. 1, for example, the network device 101, the network device 102, or the network device 105, may be any device having a wireless transceiver function. The network device includes but is not limited to: an evolved NodeB (NodeB, eNB, or e-NodeB) in LTE, a base station (gNodeB or gNB) or a transmission reception point (transmission receiving point/transmission reception point, TRP) in NR, a subsequently evolved base station in 3GPP, and the like. A base station may be a macro base station, a micro base station, a pico base station, a small cell, a relay station, a balloon station, or the like. A plurality of base stations may support networks using a same technology mentioned above, or may support networks using different technologies mentioned above. The base station may include one or more co-site or non-co-site TRPs. The network device may alternatively be a radio controller, a centralized unit (CU), and/or a distributed unit (DU) in a cloud radio access network (CRAN) scenario.

The terminal in FIG. 1, for example, the terminal 103 or the terminal 104, is a device having a wireless transceiver function, and may be deployed on land, including an indoor or outdoor device, a handheld device, a wearable device, or a vehicle-mounted device; or may be deployed on the water (for example, on a ship); or may be deployed in the air (for example, on an airplane, a balloon, or a satellite). The terminal may be a mobile phone, a tablet (Pad), a computer having a wireless transceiver function, a virtual reality (VR) terminal device, an augmented reality (AR) terminal device, a terminal in industrial control, a vehicle-mounted terminal device, a terminal in self-driving, a terminal in assisted driving, a terminal in telemedicine (remote medical), a terminal in a smart grid, a terminal in transportation safety, a terminal in a smart city, a terminal in a smart home, or the like. An application scenario is not limited in embodiments of this application. Sometimes, the terminal may also be referred to as a terminal device, user equipment (UE), an access terminal, a vehicle-mounted terminal, an industrial control terminal, a UE unit, a UE station, a mobile station, a mobile console, a remote station, a remote terminal, a mobile device, a UE terminal device, a wireless communication device, a machine terminal, a UE agent, a UE apparatus, or the like. The terminal may be fixed or mobile.

By way of example and not limitation, the terminal in this application may alternatively be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and work with other devices such as smartphones, for example, various smart bands or smart jewelry for monitoring physical signs.

In FIG. 1, the terminal 103 or the terminal 104 may be dual-connected to the network device 101 and the network device 102. One network device is an MN, and the other network device is an SN. One or more serving cells in the MN form a master cell group (MCG). The MCG includes a primary cell (PCell). In addition to the PCell, the MCG may optionally include one or more secondary cells (SCells). One or more serving cells in the SN form a secondary cell group (SCG). The SCG includes a PSCell. In addition to the PSCell, the SCG may optionally include one or more SCells.

In the communication system 10 shown in FIG. 1, the terminal 103 or the terminal 104 may perform CPAC. For example, the terminal 103 may perform CPA by using the following example 1, and perform CPC by using the following example 2.

Example 1: For example, the terminal 103 establishes an RRC connection to the network device 101, and the terminal 103 is to perform CPA and establish a connection to the network device 102. After establishing the RRC connection to the terminal 103, the network device 101 may configure one or more candidate PSCells for the terminal 103, where the one or more candidate PSCells include a PSCell configured by the network device 102 for the terminal 103 and a PSCell configured by another network device for the terminal 103. The network device 101 sends configuration information 1 of the one or more candidate PSCells to the terminal 103, where the configuration information 1 of the candidate PSCell includes a configuration 1 and an addition condition of the candidate PSCell. After receiving the configuration information 1 of the one or more candidate PSCells from the network device 101, the terminal 103 may detect the addition condition of the one or more candidate PSCells. When detecting at least one candidate PSCell that meets the addition condition, the terminal 103 selects one candidate PSCell (for example, the candidate PSCell configured by the network device 102 for the terminal), and applies a configuration of the candidate PSCell. Subsequently, the terminal 103 initiates random access to the candidate PSCell, and establishes dual connections to the network device 101 and the network device 102 after the random access to the candidate PSCell succeeds. The configuration information 1 of the candidate PSCell may also be referred to as CPA configuration information 1 of the candidate PSCell. This is not limited.

It may be understood that, when detecting a plurality of candidate PSCells that meet the addition condition, the terminal 103 may select one candidate PSCell according to a preset policy, and apply a configuration of the candidate PSCell. For example, when detecting the plurality of candidate PSCells that meet the addition condition, the terminal 103 may randomly select one candidate PSCell, and apply a configuration of the candidate PSCell; or may select, from the plurality of candidate PSCells that meet the addition condition, a candidate PSCell with best signal quality, and apply a configuration of the candidate PSCell; or may select, from a plurality of candidate PSCells that meet the addition condition and whose quantities of beams each are greater than or equal to a threshold, a candidate PSCell with a maximum quantity of beams, and apply a configuration of the candidate PSCell. The foregoing is merely an example in which the terminal 103 selects the candidate PSCell. The terminal 103 may select the candidate PSCell in another manner. This is not limited.

Example 2: The terminal 103 is dual-connected to the network device 101 and the network device 102, the network device 101 is an MN, the network device 102 is an SN, and the terminal 103 is to perform CPC. The network device 101 may configure one or more candidate PSCells for the terminal 103. The network device 101 sends configuration information 2 of the one or more candidate PSCells to the terminal 103, where the configuration information 2 of the candidate PSCell includes a configuration 2 and a change condition of the candidate PSCell. After receiving the configuration information 2 of the one or more candidate PSCells from the network device 101, the terminal 103 may detect the change condition of the one or more candidate PSCells. When detecting at least one candidate PSCell that meets the change condition, the terminal 103 selects one candidate PSCell, and applies a configuration of the candidate PSCell. Subsequently, the terminal 103 initiates random access to the candidate PSCell, and after the random access to the candidate PSCell succeeds, establishes dual connections to the network device 101 and a secondary base station to which the candidate PSCell belongs. The configuration information 2 of the candidate PSCell may also be referred to as CPC configuration information 2 of the candidate PSCell. This is not limited.

It may be understood that, when detecting a plurality of candidate PSCells that meet the change condition, the terminal 103 may select one candidate PSCell according to a preset policy, and apply a configuration of the candidate PSCell. For example, when detecting the plurality of candidate PSCells that meet the change condition, the terminal 103 may randomly select one candidate PSCell, and apply a configuration of the candidate PSCell; or may select, from the plurality of candidate PSCells that meet the change condition, a candidate PSCell with best signal quality, and apply a configuration of the candidate PSCell; or may select, from a plurality of candidate PSCells that meet the change condition and whose quantities of beams each are greater than or equal to a threshold, a candidate PSCell with a maximum quantity of beams, and apply a configuration of the candidate PSCell. The foregoing is merely an example in which the terminal 103 selects the candidate PSCell. The terminal 103 may select the candidate PSCell in another manner. This is not limited.

It should be noted that, in embodiments of this application, for any one of one or more candidate PSCells configured by any network device for the terminal, configuration information 1 of the candidate PSCell that is used when the terminal performs CPA and configuration information 2 of the candidate PSCell that is used when the terminal performs CPC may be collectively referred to as configuration information of the candidate PSCell, and a configuration 1 of the candidate PSCell that is used when the terminal performs CPA and a configuration 2 of the candidate PSCell that is used when the terminal performs CPC may be collectively referred to as a configuration of the candidate PSCell. The configuration information of the candidate PSCell includes a configuration and an addition/change condition of the candidate PSCell. When the terminal performs CPA, a configuration of a candidate PSCell is used by the terminal to communicate with the candidate PSCell after the terminal adds the candidate PSCell, an addition/change condition of the candidate PSCell includes an addition condition of the candidate PSCell, and the addition condition of the candidate PSCell is used by the terminal to determine whether to add the candidate PSCell. When the terminal performs CPC, a configuration of a candidate PSCell is used by the terminal to communicate with the candidate PSCell after the terminal changes from an original PSCell to the candidate PSCell, an addition/change condition of the candidate PSCell includes a change condition of the candidate PSCell, and the change condition of the candidate PSCell is used by the terminal to determine whether to change from the original PSCell to the candidate PSCell.

When the terminal 103 receives the configuration and the addition/change condition of the one or more candidate PSCells, but has not detected a PSCell that meets the addition/change condition, the terminal 103 may be further handed over from a current MN to a target MN with better signal quality. For example, the terminal 103 may be handed over from the network device 101 to the network device 105. However, after the terminal 103 performs MN handover, the current MN releases one or more candidate PSCells configured for the terminal 103. After establishing an RRC connection to the terminal 103, the target MN may reconfigure one or more candidate PSCells for the terminal 103, and send, to the terminal 103, configuration information of the one or more candidate PSCells configured by the target MN for the terminal to perform CPAC by the terminal, where the configuration information of the one or more candidate PSCells configured by the target MN for the terminal includes a configuration and an addition/change condition of the candidate PSCell.

However, the configuration and the addition/change condition of the candidate PSCell generally include much information. For example, the configuration of the candidate PSCell includes: an identifier of the configuration of the candidate PSCell, and/or a random access resource allocated by the candidate PSCell to the terminal, and/or a cell radio network temporary identifier (C-RNIT), and/or a global cell identifier (CGI) of the candidate PSCell, and/or a physical cell identifier (PCI) of the candidate PSCell, and/or frequency information corresponding to the candidate PSCell. The frequency information corresponding to the candidate PSCell may include one or more of the following: an absolute frequency (for example, absoluteFrequencySSB) of a synchronization signal block, an absolute frequency location (for example, absoluteFrequencyPointA) of a reference resource module (common RB0), a frequency bandwidth list (for example, frequencyBandList), a subcarrier spacing (SCS) specific carrier list (for example, scs-SpecificCarrierList), and the like. The configuration of the candidate PSCell further includes resource information corresponding to the candidate PSCell. The resource information corresponding to the candidate PSCell includes one or more of the following: a bearer configuration parameter (radioBearerConfig), a cell group configuration (cellGroupConfig) parameter, a physical (PHY) layer configuration parameter, a media access control (MAC) layer configuration parameter, a radio link control (RLC) layer configuration parameter, a packet data convergence protocol (PDCP) layer configuration parameter, a service data adaptation protocol (SDAP) layer configuration parameter, or an RRC layer configuration parameter. The configuration of the candidate PSCell may also be referred to as a CPAC configuration of the candidate PSCell, CPAC configuration information of the candidate PSCell, or the like. This is not limited.

The addition/change condition of the candidate PSCell is used by the terminal to determine whether to add the candidate PSCell, or used by the terminal to determine whether to change from the original PSCell to the candidate PSCell. For example, if the terminal detects that the candidate PSCell meets the addition/change condition of the candidate PSCell, the terminal determines to add the candidate PSCell, or changes from the original PSCell to the candidate PSCell. If the terminal detects that the candidate PSCell does not meet the addition/change condition of the candidate PSCell, the terminal determines not to add the candidate PSCell, or not to change from the original PSCell to the candidate PSCell.

Optionally, the addition/change condition of the candidate PSCell includes an execution event type of the addition/change condition of the candidate PSCell, and the execution event type may also be referred to as a measurement event, a reporting event, or the like. The terminal may measure signal quality of the candidate PSCell, or measure signal quality of the candidate PSCell and signal quality of a neighboring cell of the candidate PSCell, and determine, based on a measurement result and the execution event type, whether to add the candidate PSCell, or determine whether to change from the original PSCell to the candidate PSCell.

In a possible implementation, the execution event type includes one or more events. For example, the execution event type may include one or more of the following events: an event A3, an event A4, an event A5, an event B1, or an event B2. The event A3 indicates that signal quality of a neighboring cell is greater than or equal to signal quality of a special cell (SpCell) by a specific offset. The event A4 indicates that signal quality of a neighboring cell is greater than or equal to a specific threshold. The event A5 indicates that signal quality of an SpCell is less than or equal to a threshold 1 and signal quality of a neighboring cell is greater than or equal to a threshold 2. The event B1 indicates that signal quality of an inter-radio access technology (inter-RAT) neighboring cell is greater than or equal to a specific threshold. The event B2 indicates that signal quality of a PCell is less than or equal to a threshold 3 and signal quality of an inter-RAT neighboring cell is greater than or equal to a threshold 4. The foregoing event is merely an example of the event in the execution event type. The execution event type may further include another event. This is not limited. The execution event type further includes a threshold corresponding to the event in the execution event type. The execution event type further includes a time length (time-ToTrigger) meeting a trigger condition of the event in the execution event type, a hysteresis value for entering/exiting the event in the execution event type, and/or the like. The event in the execution event type may correspond to one or more thresholds. For example, the event A5 corresponds to two thresholds. A same event in the execution event type may correspond to different measurement metrics. For example, the event A3 may correspond to A3 reference signal received power (RSRP) and A3 reference signal received quality (RSRQ).

In conclusion, a configuration and an addition/change condition of one or more candidate PSCells usually have a large payload size, and air interface overheads for receiving the configuration and the addition/change condition of the one or more candidate PSCells by the terminal are high.

To resolve a problem of high air interface overheads for performing CPAC by a target MN and a terminal due to MN handover of the terminal, embodiments of this application provide a communication method. A current MN may indicate, to a target MN, configuration information of a candidate PSCell configured by the current MN for a terminal. After the target MN receives the configuration information of the candidate PSCell configured by the current MN for the terminal, where a candidate PSCell configured by the target MN for the terminal may include all or some candidate PSCells configured by the current MN for the terminal, the target MN may send, to the terminal based on the configuration information of the candidate PSCell configured by the current MN for the terminal, an identifier of the candidate PSCell configured by the target MN for the terminal, or an identifier of configuration information of the candidate PSCell configured by the target MN for the terminal, or delta configuration information of the candidate PSCell configured by the target MN for the terminal. The terminal receives the identifier of the candidate PSCell configured by the target MN for the terminal, or the identifier of the configuration information of the candidate PSCell configured by the target MN for the terminal, or the delta configuration information of the candidate PSCell configured by the target MN for the terminal, to obtain, based on the configuration information of the candidate PSCell configured by the current MN for the terminal, the configuration information of the candidate PSCell configured by the target MN for the terminal. A size of the identifier of the candidate PSCell configured by the target MN for the terminal, or the identifier of the configuration information of the candidate PSCell configured by the target MN for the terminal, or the delta configuration information of the candidate PSCell configured by the target MN for the terminal is less than a size of full configuration information of the candidate PSCell configured by the target MN for the terminal delta configuration. Therefore, air interface overheads for performing CPAC by the target MN and the terminal are reduced. For example descriptions of the communication method, refer to the following methods shown in FIG. 3 to FIG. 5.

The communication system 10 shown in FIG. 1 is merely used as an example, but is not intended to limit the technical solutions in this application. A person skilled in the art should understand that in some embodiments, the communication system 10 may further include another device, and a quantity of network devices and a quantity of terminal devices may alternatively be determined according to a specified requirement. This is not limited.

Optionally, each network element in FIG. 1 in embodiments of this application, for example, the network device 101, the network device 102, the terminal 103, the terminal 104, or the network device 105, may be a functional module in an apparatus. It may be understood that the functional module may be an element in a hardware device, for example, a communication chip or a communication component in a terminal or a network device, or may be a software functional module running on hardware or a virtualized function instantiated on a platform (for example, a cloud platform).

Figure 2:
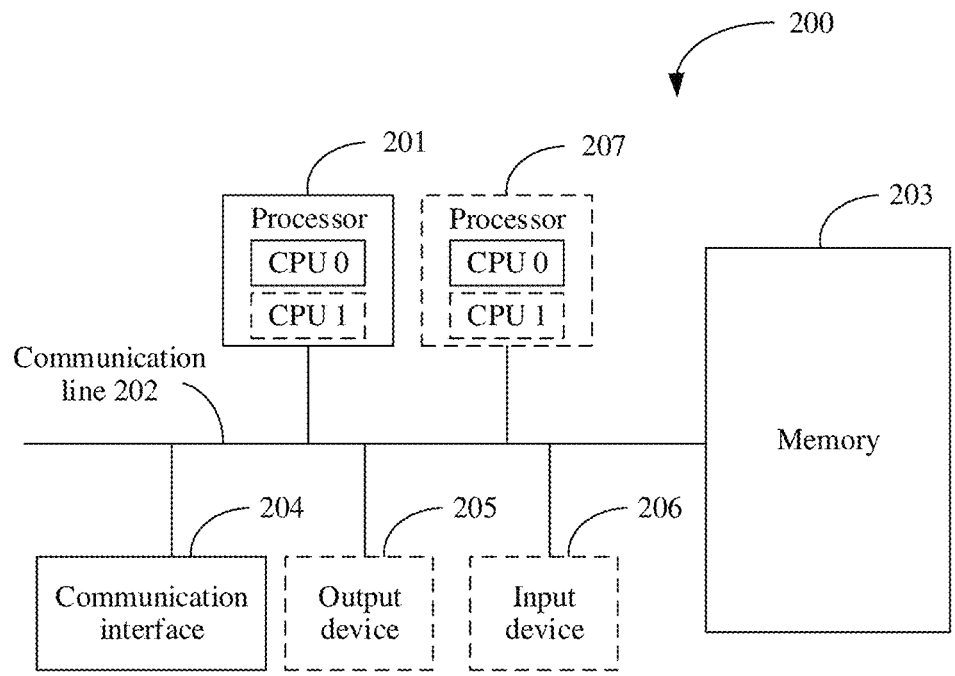
FIG. 2 is a schematic diagram of a hardware structure of a communication apparatus according to an embodiment of this application.

For example, each network element in FIG. 1 may be implemented by a communication apparatus 200 in FIG. 2. FIG. 2 is a schematic diagram of a hardware structure of the communication apparatus that may be used in an embodiment of this application. The communication apparatus 200 may include at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control program execution in the solutions in this application.

The communication line 202 may include a path such as a bus for transmitting information between the foregoing components.

The communication interface 204 is configured to communicate with another device or a communication network by using any apparatus such as a transceiver, and is, for example, an Ethernet interface, a radio access network (RAN) interface, or a wireless local area network (WLAN) interface.

The memory 203 may be a read-only memory (ROM) or another type of static storage device capable of storing static information and instructions, or a random access memory (RAM) or another type of dynamic storage device capable of storing information and instructions. Alternatively, the memory 203 may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through the communication line 202. The memory may alternatively be integrated with the processor. The memory provided in embodiments of this application may be usually non-volatile. The memory 203 is configured to store computer-executable instructions for executing the solutions in this application, and execution is controlled by the processor 201. The processor 201 is configured to execute the computer-executable instructions stored in the memory 203, to implement the method provided in embodiments of this application.

Optionally, the computer-executable instructions in embodiments of this application may also be referred to as application program code. This is not specifically limited in embodiments of this application.

In some embodiments, the processor 201 may include one or more CPUs, for example, a CPU 0 and a CPU 1 in FIG. 2.

In some embodiments, the communication apparatus 200 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In some embodiments, the communication apparatus 200 may further include an output device 205 and an input device 206. The output device 205 communicates with the processor 201, and may display information in a plurality of manners. For example, the output device 205 may be a liquid crystal display (LCD), a light-emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

In some embodiments, the communication apparatus 200 may be a desktop computer, a portable computer, a network server, a personal digital assistant (PDA), a mobile phone, a tablet computer, a wireless terminal device, an embedded device, or a device having a structure similar to that in FIG. 2. A type of the communication apparatus 200 is not limited in this embodiment of this application.

The following describes the communication method in embodiments of this application with reference to FIG. 1 and FIG. 2. Network elements in the following embodiments may have the components shown in FIG. 2.

It should be noted that names of messages between network elements, names of parameters in the messages, or the like in the following embodiments of this application are merely examples, and there may be other names in various implementations. This is not specifically limited to the discussed embodiments of this application.

It should be noted that, in descriptions of this application, a word such as "first" or "second" is merely used for distinction and description, and shall not be understood as an indication or implication of relative importance or an indication or implication of an order. Numbers of messages such as a "first message" with different numbers in this application are merely used for contextual convenience, and different sequence numbers do not have specific technical meanings. For example, a first message or a second message may be understood as one or any one of a series of messages. It may be understood that, in some embodiments, messages with different numbers may alternatively be messages of a same type. This is not limited in this application.

It should be noted that, in embodiments of this application, configuration information of any PSCell may be replaced with configuration information of an SCG to which the PSCell belongs. For example, the configuration information of the candidate PSCell may be replaced with configuration information of an SCG to which the candidate PSCell belongs. The configuration information of the any PSCell includes a configuration and an addition/change condition of the PSCell, and the configuration information of the SCG to which the PSCell belongs includes the configuration information of the PSCell; or the configuration information of the SCG to which the PSCell belongs includes the configuration information of the PSCell and configuration information of one or more SCells in the SCG. The configuration information of the any SCell in the SCG includes a configuration of the SCell; or the configuration information of the any SCell in the SCG includes a configuration and an addition/change condition of the SCell. For descriptions of the configuration and the addition/change condition of the PSCell, and the configuration and the addition/change condition of the SCell, refer to the foregoing descriptions of the configuration and the addition/change condition of the candidate PSCell. Details are not described again.

It may be understood that, in embodiments of this application, a terminal, a first master node, a second master node, or a first candidate secondary node may perform some or all of the steps in embodiments of this application. These steps are merely examples, and in embodiments of this application, other steps or variations of various steps may alternatively be performed. In addition, the steps may be performed in a sequence different from a sequence presented in embodiments of this application, and not all the steps in embodiments of this application need to be performed.

Figure 3:
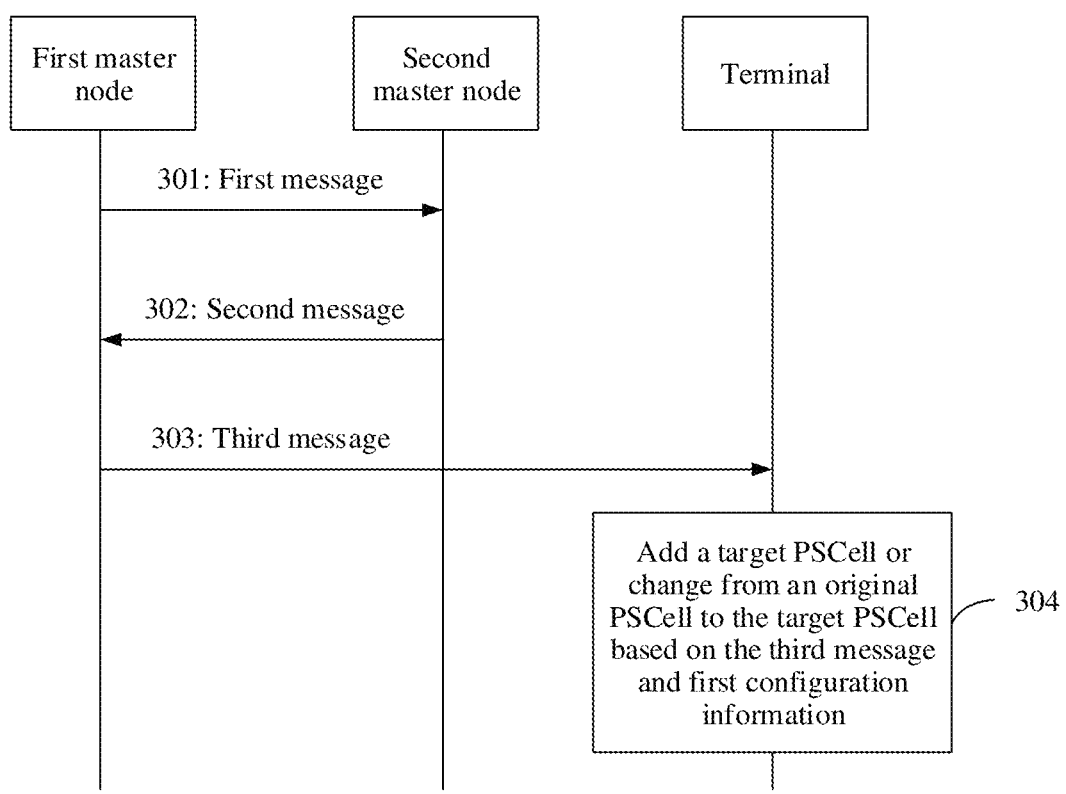
FIG. 3 is a schematic flowchart 1 of a communication method according to an embodiment of this application.

FIG. 3 shows a communication method according to an embodiment of this application. The communication method includes step 301 to step 304.

Step 301: A first master node sends a first message to a second master node.

The first master node may be the network device 101 or the network device 102 in FIG. 1, or may be a component in the network device 101 or the network device 102. For example, the first master node may be a processor in the network device 101 or the network device 102, a chip in the network device 101 or the network device 102, or a chip system in the network device 101 or the network device 102. This is not limited.

The second master node may be the network device 105 in FIG. 1, or may be a component in the network device 105. For example, the second master node may be a processor in the network device 105, a chip in the network device 105, or a chip system in the network device 105. This is not limited.

Optionally, the first master node is a master node to which a terminal is currently connected. The second master node is a target master node to which the terminal is handed over.

The terminal may be the terminal 103 or the terminal 104 in FIG. 1, or may be a component in the terminal 103 or the terminal 104. For example, the terminal may be a processor in the terminal 103 or the terminal 104 in FIG. 1, a chip in the terminal 103 or the terminal 104 in FIG. 1, or a chip system in the terminal 103 or the terminal 104 in FIG. 1. This is not limited.

Before being handed over from the first master node to the second master node, the terminal performs CPA or CPC, but has not detected a PSCell that meets an addition/change condition. For a case in which the terminal performs CPA, refer to descriptions in the following case 1. For a case in which the terminal performs CPC, refer to descriptions in the following case 2.

Case 1: The first message may be used to indicate first configuration information of a candidate PSCell in a first PSCell list, or the first message may be used to indicate a candidate PSCell in a first PSCell list.

Optionally, the first configuration information includes an addition condition and a configuration of the candidate PSCell in the first PSCell list, and the first PSCell list includes one or more candidate PSCells configured by the first master node for the terminal. The first PSCell list may also be referred to as a first PSCell set, a first PSCell group, or the like. This is not limited.

Optionally, when the first message is used to indicate the first configuration information of the candidate PSCell in the first PSCell list, the first message includes the first configuration information; or when the first message is used to indicate the candidate PSCell in the first PSCell list, the first message includes an identifier of the candidate PSCell in the first PSCell list, or an identifier of an SCG to which the candidate PSCell in the first PSCell list belongs, or another identifier used to indicate the candidate PSCell in the first PSCell list.

Optionally, before step 301, the first master node obtains the first configuration information. For example, for a first candidate node to which any candidate PSCell in the first PSCell list belongs, the first master node sends a first conditional secondary node addition request message to the first candidate node. After receiving the first conditional secondary node addition request message, the first candidate node may acknowledge the first conditional secondary node addition request message, or may reject the request. If the first candidate node acknowledges the first conditional secondary node addition request message, the first candidate node sends a first addition request acknowledgment message to the first master node. After receiving the first addition request acknowledgment message, the first master node may send, to the terminal, configuration information of a PSCell configured by the first candidate node for the terminal, and receive a first verification complete message from the terminal, where the configuration information of the PSCell configured by the first candidate node for the terminal includes a configuration and an addition condition of the PSCell configured by the first candidate node for the terminal.

The first conditional secondary node addition request message may be used to request the first candidate node to preconfigure the configuration information of the PSCell for the terminal. The first conditional secondary node addition request message is further used to indicate that the configuration information of the PSCell configured by the first candidate node for the terminal is used for conditional secondary node addition.

The first conditional secondary node addition request message may include a measurement result of the first candidate node, for example, a measurement result of signal quality of a cell of the first candidate node. The measurement result of the first candidate node may be used as a reference for configuring the configuration information of the PSCell by the first candidate node for the terminal.

Optionally, the first conditional secondary node addition request message is a message obtained after a conditional addition indication is added to a secondary node addition request (SN addition request) message, or the first conditional secondary node addition request message is a newly added message. The conditional addition indication may be 1-bit indication information. For example, when the conditional addition indication is 1, the secondary node addition request message may be used to indicate that the configuration information of the PSCell configured by the first candidate node for the terminal is used for conditional secondary node addition.

The first addition request acknowledgment message includes a first RRC container. The addition condition of the PSCell configured by the first candidate node for the terminal is determined by the first master node, or determined by the first candidate node, or determined by the first master node and the first candidate node through negotiation. When the addition condition of the PSCell configured by the first candidate node for the terminal is determined by the first master node, the first RRC container includes the configuration of the PSCell configured by the first candidate node for the terminal. When the addition condition of the PSCell configured by the first candidate node for the terminal is determined by the first candidate node, the first RRC container includes the configuration and the addition condition of the PSCell configured by the first candidate node for the terminal. Information included in the first RRC container is included in an RRC message generated by the first candidate node, and subsequently, the RRC message is forwarded by the first master node to the terminal.

The first verification complete message is used to indicate that the terminal can apply the configuration information of the PSCell configured by the first candidate node for the terminal.

Case 2: The first message may be used to indicate first configuration information of a candidate PSCell in a first PSCell list and an original PSCell, or the first message may be used to indicate a candidate PSCell in a first PSCell list and an original PSCell.

Optionally, the first configuration information includes a change condition and a configuration of the candidate PSCell in the first PSCell list. For descriptions of the first PSCell list, refer to the descriptions in the foregoing case 1. Details are not described again.

Optionally, when the first message is used to indicate the first configuration information of the candidate PSCell in the first PSCell list and the original PSCell, the first message includes the first configuration information and an identifier of the original PSCell; or when the first message is used to indicate the candidate PSCell in the first PSCell list and the original PSCell, the first message includes an identifier of the candidate PSCell in the first PSCell list and an identifier of the original PSCell, or an identifier of an SCG to which the candidate PSCell in the first PSCell list belongs and the identifier of the original PSCell, or another identifier used to indicate the candidate PSCell in the first PSCell list and the identifier of the original PSCell. The original PSCell is a PSCell to which the terminal is connected before the terminal is handed over from the first master node to the second master node. The first message further includes an identifier (for example, an SN UE XnAP ID) of an interface between a node to which the original PSCell belongs and the terminal. Using EN-DC as an example, the SN UE XnAP ID may be an SN UE X2AP ID.

Optionally, before step 301, the first master node obtains the first configuration information. For a process in which the first master node obtains the first configuration information, refer to the descriptions in the foregoing case 1. A difference lies in that in the case 2 the configuration information of the PSCell configured by the first candidate node for the terminal includes the configuration and the change condition of the PSCell configured by the first candidate node for the terminal, and after receiving the first addition request acknowledgment message, the first master node may send, to the terminal, the configuration information of the PSCell configured by the first candidate node for the terminal, or may send, to the terminal, different configuration information in the configuration information of the PSCell configured by the first candidate node for the terminal and the configuration information of the original PSCell.

It may be understood that, for the candidate PSCell in the first PSCell list, the first master node is to send first delta configuration information to the terminal, where the first delta configuration information includes different configuration information in configuration information of a PSCell configured for the terminal by a node to which the candidate PSCell in the first PSCell list belongs and the configuration information of the original PSCell. For example, the first delta configuration information includes an addition/modification list (ToAddModList) and/or a release list (ToReleaseList). The addition/modification list includes configuration information that is of the candidate PSCell in the first PSCell list and that is different from the configuration information of the original PSCell, and the release list includes configuration information that is of the candidate PSCell in the first PSCell list and that is to be released relative to the configuration information of the original PSCell. It should be understood that, if configuration information of one or more candidate PSCells in the first PSCell list is the same as the configuration information of the original PSCell, the first delta configuration information may not include the configuration information of the one or more candidate PSCells.

For example, if the configuration information of the original PSCell includes a data bearer 1, a data bearer 2, and a data bearer 3, the first PSCell list includes a candidate PSCell 1, a candidate PSCell 2, and a candidate PSCell 3, configuration information of the candidate PSCell 1 includes the data bearer 1 and the data bearer 2, configuration information of the candidate PSCell 2 includes the data bearer 1 and a data bearer 4, and configuration information of the candidate PSCell 3 includes the data bearer 1, the data bearer 2, and the data bearer 3, the first delta configuration information may be shown in Table 1, or the first delta configuration information may be shown in Table 2. In Table 1, the first delta configuration information includes an addition/modification list and a release list. The addition/modification list includes the data bearer 1 and the data bearer 4, and the release list includes the data bearer 3. In Table 2, the first delta configuration information includes an addition/modification list. The addition/modification list includes the data bearer 1 and the data bearer 4, and the data bearer 1 and the data bearer 2. It may be understood that neither the first delta configuration information shown in Table 1 nor the first delta configuration information shown in Table 2 includes the configuration information of the candidate PSCell 3, indicating that the configuration information of the candidate PSCell 3 is the same as the configuration information of the original PSCell.

TABLE 1

| Addition/Modification list | | Release list | |
| --- | --- | --- | --- |
| Identifier of configuration information of a candidate PSCell | Content to be added/modified | Identifier of configuration information of a candidate PSCell | Content to be released |
| Identifier of configuration information of a candidate PSCell 2 | Data bearer 1 and data bearer 4 | Identifier of configuration information of a candidate PSCell 1 | Data bearer 3 |

TABLE 2

| Addition/Modification list | |
| --- | --- |
| Identifier of configuration information of a candidate PSCell | Content to be added/modified |
| Identifier of configuration information of a candidate PSCell 1 | Data bearer 1 and data bearer 4 |
| Identifier of configuration information of a candidate PSCell 2 | Data bearer 1 and data bearer 2 |

It may be understood that Table 1 and Table 2 show merely examples of the first delta configuration information, and the first delta configuration information may alternatively be in another form. This is not limited.

It may be understood that the first configuration information may alternatively be obtained and sent to the terminal by the node to which the original PSCell belongs. For a process in which the node to which the original PSCell belongs obtains the first configuration information, and sends the first configuration information to the terminal, refer to the descriptions of obtaining the first configuration information, and sending the first configuration information to the terminal by the first master node. Details are not described again.

Optionally, for the foregoing case 1 and case 2, the first message is a handover request message.

Step 302: The second master node receives the first message from the first master node, determines, based on the first message, that the first master node configures a CPAC function for the terminal, and sends a second message to the first master node.

The second message includes a second RRC container. The second RRC container includes an identifier of a first candidate PSCell, or an identifier of configuration information of the first candidate PSCell, or second delta configuration information of a candidate PSCell in a second PSCell list. The identifier or the information included in the second RRC container is included in an RRC message generated by the second master node, and subsequently, the RRC message is forwarded by the first master node to the terminal. The first candidate PSCell is included in both the first PSCell list and the second PSCell list. The identifier of the configuration information of the first candidate PSCell is used to identify the configuration information of the first candidate PSCell. It may be understood that there may be zero or one or more first candidate PSCells. This is not limited.

The following separately describes step 302 for the case 1 and the case 2 in step 301.

For the case 1 in step 301, the second master node determines, based on the first message, that the first master node configures a CPA function for the terminal, and adds the candidate PSCell in the second PSCell list for the terminal. The second PSCell list includes one or more candidate PSCells configured by the second master node for the terminal. The second PSCell list may also be referred to as a second PSCell set, a second PSCell group, or the like. This is not limited.

For example, for a second candidate node to which any candidate PSCell in the second PSCell list belongs, after determining that the first master node configures the CPA function for the terminal, the second master node sends a second conditional secondary node addition request message to the second candidate node. After receiving the second conditional secondary node addition request message, the second candidate node may acknowledge the second conditional secondary node addition request message, or may reject the request. If the second candidate node acknowledges the second conditional secondary node addition request message, the second candidate node sends a second addition request acknowledgment message to the second master node. For descriptions of the second conditional secondary node addition request message and the second addition request acknowledgment message, refer to the descriptions of the first conditional secondary node addition request message and the first addition request acknowledgment message in step 301. Details are not described again.

Optionally, the second master node determines the second message based on the first message and the second PSCell list.

In a possible implementation, when the first message is used to indicate the first configuration information of the candidate PSCell in the first PSCell list, the second master node determines the second PSCell list and second configuration information based on the first configuration information, and determines the second message based on the first configuration information, the second PSCell list, and the second configuration information, where the second configuration information includes an addition condition and a configuration of the candidate PSCell in the second PSCell list, and the second RRC container in the second message includes the second delta configuration information of the candidate PSCell in the second PSCell list. The second delta configuration information includes different configuration information in configuration information of a same candidate PSCell configured by the second master node and the first master node for the terminal, and/or configuration information of each candidate PSCell other than the first candidate PSCell in the second PSCell list, and/or an identifier of configuration information of a candidate PSCell that is in the first PSCell list and that the second master node determines to release.

For example, the second delta configuration information includes an addition/modification list (ToAddModList) and/or a release list (ToReleaseList). The addition/modification list includes the different configuration information in the configuration information of the same candidate PSCell configured by the second master node and the first master node for the terminal, and/or the configuration information of each candidate PSCell other than the first candidate PSCell in the second PSCell list. The release list includes the identifier of the configuration information of the candidate PSCell that is in the first PSCell list and that the second master node determines to release. For a second candidate PSCell that is included in the first PSCell list but not included in the second PSCell list, if the release list does not include an identifier of configuration information of the second candidate PSCell, the second configuration information of the second candidate PSCell is the same as the first configuration information.

For example, the information included in the first message is shown in Table 3, the second PSCell list determined by the second master node includes a candidate PSCell 2, a candidate PSCell 3, and a candidate PSCell 4, second configuration information of the candidate PSCell 2 includes configuration information 4, second configuration information of the candidate PSCell 3 includes configuration information 3, and second configuration information of the candidate PSCell 4 includes configuration information 5. In Table 3, first configuration information of a candidate PSCell 1 includes configuration information 1, first configuration information of the candidate PSCell 2 includes configuration information 2, and first configuration information of the candidate PSCell 3 includes the configuration information 3. In this case, the second delta configuration information may be shown in Table 4. In Table 4, the second delta configuration information includes an addition/modification list and a release list. The addition/modification list includes the configuration information 4 and the configuration information 5, the configuration information 4 is different configuration information in the second configuration information and the first configuration information of the candidate PSCell 2, and the configuration information 5 is the second configuration information of the candidate PSCell 4. The release list includes the candidate PSCell 1. It may be understood that, if the second delta configuration information does not include related information of the candidate PSCell 3, it indicates that the second configuration information of the candidate PSCell 3 is the same as the first configuration information.

TABLE 3

| Identifier of configuration information of a candidate PSCell in a first PSCell list | First configuration information |
|---|---|
| Identifier of configuration information of a candidate PSCell 1 | Configuration information 1 |

TABLE 3-continued

| Identifier of configuration information of a candidate PSCell in a first PSCell list | First configuration information |
|---|---|
| Identifier of configuration information of a candidate PSCell 2 | Configuration information 2 |
| Identifier of configuration information of a candidate PSCell 3 | Configuration information 3 |

TABLE 4

| Addition/Modification list | | |
|---|---|---|
| Identifier of configuration information of a candidate PS Cell | Content to be added/modified | Release list |
| Identifier of configuration information of a candidate PS Cell 2 | Configuration information 4 | Candidate PSCell 1 |
| Identifier of configuration information of a candidate PS Cell 4 | Configuration information 5 | |

It may be understood that Table 4 shows merely an example of the second delta configuration information, and the second delta configuration information may alternatively be in another form. This is not limited.

In another possible implementation, when the first message is used to indicate the candidate PSCell in the first PSCell list, the second master node determines the second candidate PSCell list based on the first PSCell list, and determines the second message based on the second candidate PSCell list, where the second RRC container in the second message includes the identifier of the first candidate PSCell, or an identifier of an SCG to which the first candidate PSCell belongs, or the identifier of the configuration information of the first candidate PSCell, or another identifier used to indicate the candidate PSCell in the second PSCell list. In this case, the PSCell in the second PSCell list is included in the first PSCell list, or the second PSCell list is the same as the first PSCell list, and the addition/change condition and the configuration of the candidate PSCell in the second PSCell list are the same as those of the corresponding candidate PSCell in the first PSCell list. It may be understood that the identifier of the configuration information of the first candidate PSCell may be sent by the first master node to the second master node, or may be sent by the first candidate PSCell to the second master node.

For the case 2 in step 301, the second master node determines, based on the first message, that the first master node configures a CPC function for the terminal, and adds the candidate PSCell in the second PSCell list for the terminal. For descriptions of the second PSCell list and a process in which the second master node adds the candidate PSCell in the second PSCell list, refer to the descriptions in the case 1 in step 302. A difference lies in that the configuration information of the PSCell configured by the second candidate node for the terminal includes the configuration and the change condition of the PSCell configured by the second candidate node for the terminal.

Optionally, the second master node determines the second message based on the first message and the second PSCell list. For example descriptions of this process, refer to the descriptions in the case 1 in step 302. A difference lies in that when the first message is used to indicate the first configuration information of the candidate PSCell in the first PSCell list, information in the second delta configuration information included in the second RRC container may alternatively be replaced with configuration information that is of the candidate PSCell in the second PSCell list and that is different from the configuration information of the original PSCell.

For example, the second delta configuration information includes an addition/modification list (ToAddModList) and/or a release list (ToReleaseList). The addition/modification list includes the configuration information that is of the candidate PSCell in the second PSCell list and that is different from the configuration information of the original PSCell, and the release list includes configuration information that is of the candidate PSCell in the second PSCell list and that is to be released relative to the configuration information of the original PSCell. It should be understood that, if configuration information of one or more candidate PSCells in the second PSCell list is the same as the configuration information of the original PSCell, the second delta configuration information may not include the configuration information of the one or more candidate PSCells. For example, if the configuration information of the original PSCell includes a data bearer 1, a data bearer 2, and a data bearer 3, the second PSCell list includes a candidate PSCell 1, a candidate PSCell 2, and a candidate PSCell 3, second configuration information of the candidate PSCell 1 includes the data bearer 1, the data bearer 2, and the data bearer 3, second configuration information of the candidate PSCell 2 includes the data bearer 1 and the data bearer 2, and second configuration information of the candidate PSCell 3 includes the data bearer 1 and a data bearer 4, the second delta configuration information may be shown in Table 5, or the second delta configuration information may be shown in Table 6. In Table 5, the second delta configuration information includes an addition/modification list and a release list. The addition/modification list includes the data bearer 1 and the data bearer 4, and the release list includes the data bearer 3. In Table 6, the second delta configuration information includes an addition/modification list. The addition/modification list includes the data bearer 1 and the data bearer 2, and the data bearer 1 and the data bearer 4. It may be understood that neither the second delta configuration information shown in Table 5 nor the second delta configuration information shown in Table 6 includes the second configuration information of the candidate PSCell 1, indicating that the second configuration information of the candidate PSCell 1 is the same as the configuration information of the original PSCell.

TABLE 5

| Addition/Modification list | | Release list | |
|---|---|---|---|
| Identifier of configuration information of a candidate PSCell | Content to be added/modified | Identifier of configuration information of a candidate PSCell | Content to be released |
| Identifier of configuration information of a candidate PSCell 3 | Data bearer 1 and data bearer 4 | Identifier of configuration information of a candidate PSCell 2 | Data bearer 3 |

TABLE 6

Addition/Modification list

| Identifier of configuration information of a candidate PSCell | Content to be added/modified |
|---|---|
| Identifier of configuration information of a candidate PSCell 2 | Data bearer 1 and data bearer 2 |
| Identifier of configuration information of a candidate PSCell 3 | Data bearer 1 and data bearer 4 |

It may be understood that Table 5 and Table 6 show merely examples of the second delta configuration information, and the second delta configuration information may alternatively be in another form. This is not limited.

It may be understood that, in a process in which the terminal is handed over from the first master node to the second master node, if the second master node determines not to change a PSCell to which the terminal is currently connected, the second master node sends an SN addition request message to the node to which the original PSCell belongs, and receives an SN addition request acknowledgment message from the node to which the original PSCell belongs. The SN addition request message may be used to request to add the original PSCell as a PSCell of the terminal. The SN addition request message may include an identifier, for example, an SN UE XnAP ID or an SN UE X2 ID, of an interface between the node to which the original PSCell belongs and the terminal, so that the node to which the original PSCell belongs determines a context with the terminal, and the original PSCell does not need to regenerate the context with the terminal. The SN addition request acknowledgment message is used to indicate, to the second master node, that the node to which the original PSCell belongs determines that the second master node adds the original PSCell for the terminal. The SN addition request acknowledgment message includes third delta configuration information or full configuration information. The third delta configuration information includes different configuration information in configuration information of the original PSCell that is used after the terminal is handed over to the second master node and configuration information of the original PSCell that is used before the terminal is handed over to the second master node. The full configuration information includes the configuration information of the original PSCell that is used after the terminal is handed over to the second master node.

Optionally, for the foregoing case 1 and case 2, the second message is a handover request acknowledgment message.

Step 303: The first master node receives the second message from the second master node, and sends a third message to the terminal.

Optionally, the third message includes the identifier of the first candidate PSCell, or the identifier of the configuration information of the first candidate PSCell, or the second delta configuration information of the candidate PSCell in the second PSCell list. For descriptions of the identifier of the first candidate PSCell, or the identifier of the configuration information of the first candidate PSCell, or the second delta configuration information of the candidate PSCell in the second PSCell list, refer to the descriptions in step 302. Details are not described again.

Step 304: The terminal receives the third message from the first master node, and adds a target PSCell or changes from the original PSCell to the target PSCell based on the third message and the first configuration information.

The target PSCell is a candidate PSCell in the second PSCell list.

The following separately describes step 303 for the case 1 and the case 2 in step 301 and step 302.

For the case 1 in step 301 and step 302, the terminal determines the second configuration information based on the third message and the first configuration information, and adds, based on the second configuration information, a PSCell that is in the second PSCell list and that meets the addition condition of the candidate PSCell as the target PSCell.

In a possible implementation, if the third message includes the identifier of the first candidate PSCell or the identifier of the configuration information of the first candidate PSCell, the terminal determines the first configuration information corresponding to the identifier of the first candidate PSCell or the identifier of the configuration information of the first candidate PSCell as the second configuration information.

For example, the first PSCell list includes a candidate PSCell 1, a candidate PSCell 2, and a candidate PSCell 3, and the second PSCell list includes the candidate PSCell 2 and the candidate PSCell 3. The terminal may determine first configuration information of the candidate PSCell 2 as second configuration information of the candidate PSCell 2, and determine first configuration information of the candidate PSCell 3 as second configuration information of the candidate PSCell 3.

In a possible implementation, if the third message includes the second delta configuration information of the candidate PSCell in the second PSCell list, the terminal determines the second configuration information based on the second delta configuration information and the first configuration information. For the second delta configuration information of the candidate PSCell in the second PSCell list, refer to the descriptions in step 302. Details are not described again.

For example, the terminal traverses configuration information corresponding to each candidate PSCell in the addition/modification list in the second delta configuration information, determines the configuration information corresponding to each candidate PSCell in the addition/modification list as second configuration information of the candidate PSCell, and determines first configuration information of a candidate PSCell that is included in the first PSCell list but not included in the addition/modification list or the release list as second configuration information of the candidate PSCell. The terminal may further delete stored first configuration information of each candidate PSCell in the release list.

Using the first configuration information shown in Table 3 and the second delta configuration information shown in Table 4 as an example, the second configuration information of the candidate PSCell in the second PSCell list may be shown in Table 7. In Table 7, the second configuration information of the candidate PSCell 2 includes the configuration information 4, the second configuration information of the candidate PSCell 3 includes the configuration information 3, and the second configuration information of the candidate PSCell 4 includes the configuration information 5. The terminal may further delete stored first configuration information of the candidate PSCell 1.

TABLE 7

| Identifier of configuration information of a candidate PSCell in a second PSCell list | Second configuration information |
|---|---|
| Identifier of configuration information of a candidate PSCell 2 | Configuration information 4 |
| Identifier of configuration information of a candidate PSCell 3 | Configuration information 3 |
| Identifier of configuration information of a candidate PSCell 4 | Configuration information 5 |

Optionally, that the terminal adds a PSCell that is in the second PSCell list and that meets the addition condition of the candidate PSCell as the target PSCell includes: The terminal determines a target PSCell that meets the addition condition of the candidate PSCell and that is in the second PSCell list, and initiates random access to the target PSCell.

For the case 2 in step 301 and step 302, the terminal determines the second configuration information based on the third message and the first configuration information, and changes from the original PSCell to the target PSCell based on the second configuration information.

In a possible implementation, if the third message includes the identifier of the first candidate PSCell or the identifier of the configuration information of the first candidate PSCell, the terminal determines the first configuration information corresponding to the identifier of the first candidate PSCell or the identifier of the configuration information of the first candidate PSCell as the second configuration information; or if the third message includes the second delta configuration information of the candidate PSCell in the second PSCell list, the terminal determines the second configuration information based on the second delta configuration information and the first configuration information. For details, refer to the descriptions in the case 1 in step 303. Details are not described again.

Optionally, that the terminal changes from the original PSCell to the target PSCell includes: The terminal determines a target PSCell that is in the second PSCell list and that meets the change condition of the candidate PSCell, initiates random access to the target PSCell, and releases a connection to the original PSCell.

Optionally, for the foregoing case 1 and case 2, the terminal releases a connection to the first master node, initiates random access to the second master node, and sends a reconfiguration complete message to the second master node after the random access succeeds, where the reconfiguration complete message is used to indicate that the terminal successfully performs master node handover and that the terminal successfully verifies the second configuration information.

Optionally, if the terminal adds the target PSCell, or changes from the original PSCell to the target PSCell, the terminal sends an acknowledgment message to the second master node, where the acknowledgment message includes an identifier of the target PSCell or an identifier of an SCG to which the target PSCell belongs.

Optionally, the acknowledgment message further includes a reconfiguration complete message sent by the terminal to the target PSCell, and the reconfiguration complete message is used to indicate that the terminal successfully adds the target PSCell or that the terminal successfully changes from the original PSCell to the target PSCell. Correspondingly, after receiving the acknowledgment message, the second master node sends, to the target PSCell, the reconfiguration complete message sent by the terminal to the target PSCell.

Based on the method shown in FIG. 3, the terminal may receive the third message from the first master node, where the third message includes the identifier of the first candidate PSCell, or the identifier of the configuration information of the first candidate PSCell, or the second delta configuration information of the candidate PSCell in the second PSCell list; and the terminal may add the target PSCell or change from the original PSCell to the target PSCell based on the third message and the addition/change condition and the configuration of the candidate PSCell in the first PSCell list. A size of the identifier or the information included in the third message is less than a size of the addition/change condition and the configuration of the candidate PSCell in the second PSCell list. Therefore, air interface overheads for performing CPAC by the second master node and the terminal can be reduced.

Figure 4:
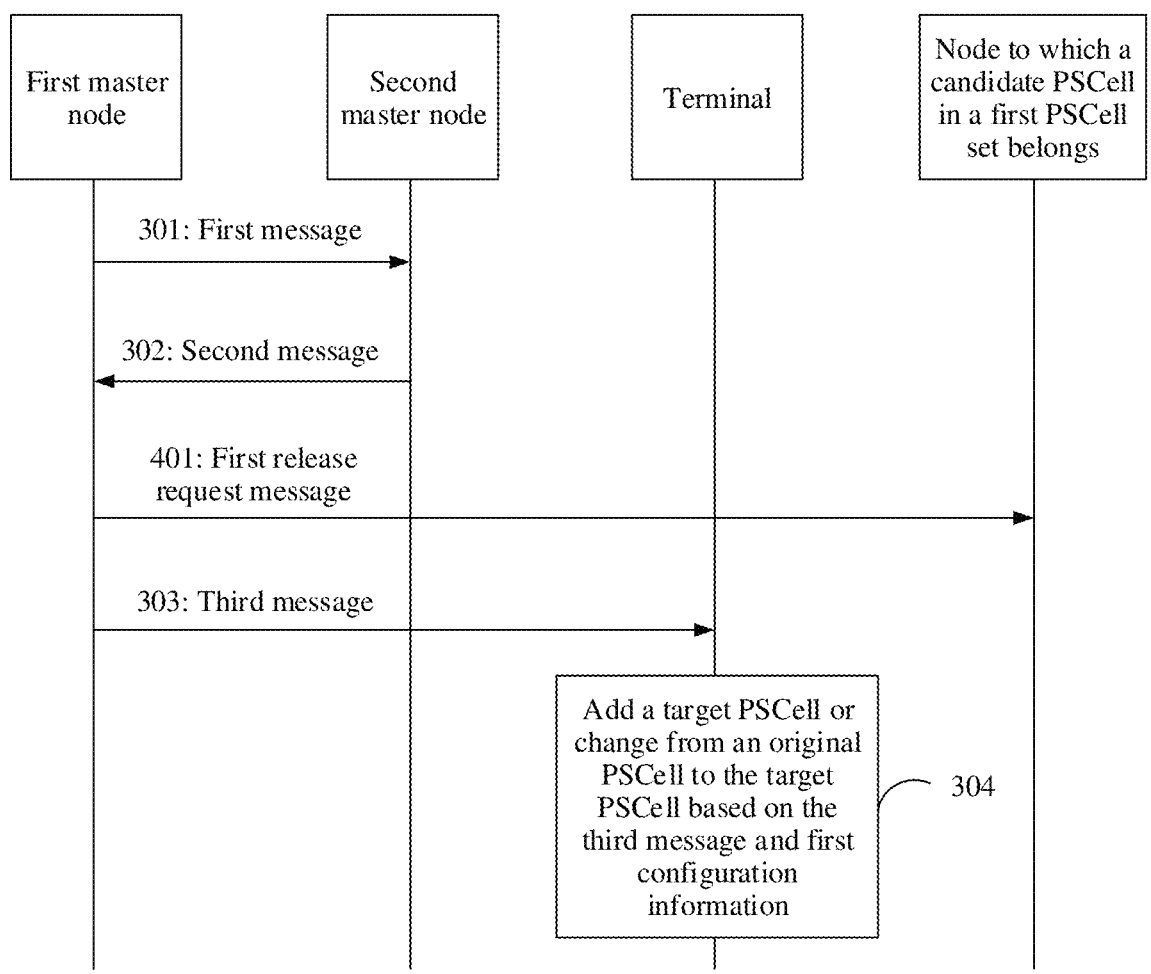
FIG. 4 is a schematic flowchart 2 of a communication method according to an embodiment of this application.

Further optionally, in an implementation of the method shown in FIG. 3, the first master node may further send a first release request message to a node to which each candidate PSCell in the first PSCell list belongs, so that the first master node releases each candidate PSCell in the first PSCell list. As shown in FIG. 4, the method shown in FIG. 3 further includes step 401.

Step 401: The first master node sends the first release request message to the node to which each candidate PSCell in the first PSCell list belongs.

The first release request message is used to request to release each candidate PSCell in the first PSCell list.

Optionally, for the first candidate secondary node to which the first candidate PSCell belongs, the first release request message includes indication information for retaining a context with the terminal, and the indication information is used to indicate the first candidate secondary node to retain the context with the terminal. Subsequently, the first candidate secondary node does not need to regenerate the context with the terminal. If the first candidate PSCell is determined as the target PSCell, the first candidate secondary node may communicate with the terminal by using the retained context with the terminal.

Correspondingly, the node to which each candidate PSCell in the first PSCell list belongs receives the first release request message from the first master node.

Based on the method shown in FIG. 4, after determining that the terminal is to be handed over to the second master node, the first master node may indicate the node to which each candidate PSCell in the first PSCell list belongs to release the candidate PSCell configured by the first master node for the terminal. In this way, the node to which each candidate PSCell in the first PSCell list belongs may configure the released candidate PSCell for another terminal. For the first candidate secondary node to which the first candidate PSCell belongs, the first master node may further indicate the first candidate secondary node to retain the context with the terminal. Therefore, when the second master node configures the first candidate PSCell as a candidate PSCell for the terminal, the first candidate secondary node does not need to regenerate the context with the terminal. Subsequently, if the first candidate PSCell is determined as the target PSCell, the first candidate secondary node may communicate with the terminal by using the retained context.

Figure 5:
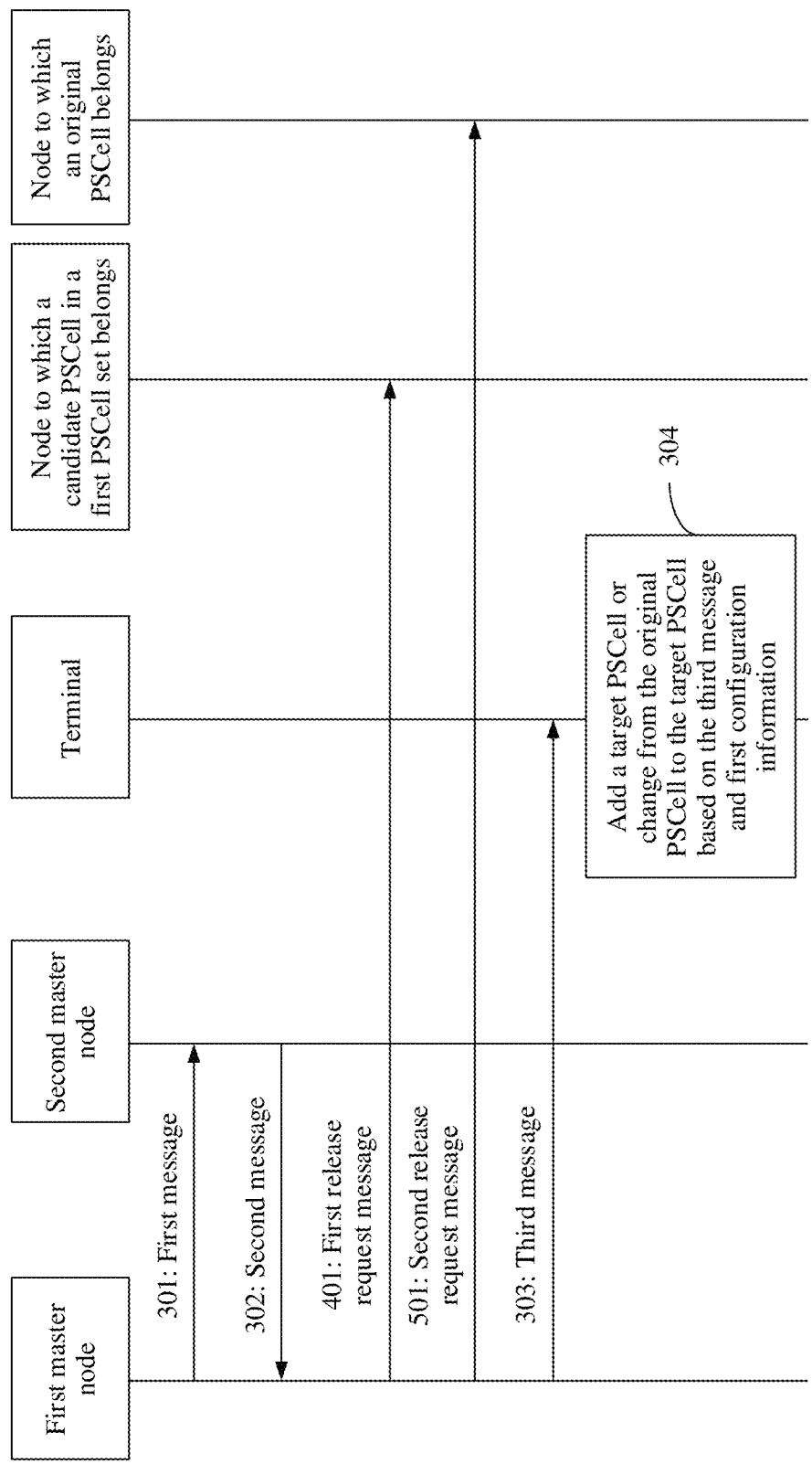
FIG. 5 is a schematic flowchart 3 of a communication method according to an embodiment of this application.

Further optionally, in an implementation of the method shown in FIG. 3, for the case 2, the first master node sends a second release request message to the node to which the original PSCell belongs, so that the first master node releases the original PSCell. For example, as shown in FIG. 5, the method shown in FIG. 4 further includes step 501.

Step 501: The first master node sends the second release request message to the node to which the original PSCell belongs.

The second release request message is used to request to release the original PSCell.

Optionally, if the second master node determines to add the original PSCell as a PSCell for the terminal, the second release request message includes indication information for retaining the context with the terminal, and the indication information is used to indicate the node to which the original PSCell belongs to retain the context with the terminal. Subsequently, the original PSCell does not need to regenerate the context with the terminal, and may communicate with the terminal by using the retained context with the terminal.

Correspondingly, the node to which the original PSCell belongs receives the second release request message from the first master node.

It may be understood that an execution sequence of step 501 and step 401 is not limited in this application. For example, step 501 may be performed before step 401, or step 401 may be performed before step 501.

Based on the method shown in FIG. 5, after determining that the terminal is to be handed over to the second master node, the first master node may indicate the node to which the original PSCell belongs to release the original PSCell. In this way, the node to which the original PSCell belongs may configure the released original PSCell for another terminal. If the second master node determines to add the original PSCell as a PSCell for the terminal, the first master node may further indicate the node to which the original PSCell belongs to retain the context with the terminal, so that the node to which the original PSCell belongs retains the context between the node to which the original PSCell belongs and the terminal, to subsequently communicate with the terminal by using the retained context.

Figure 6:
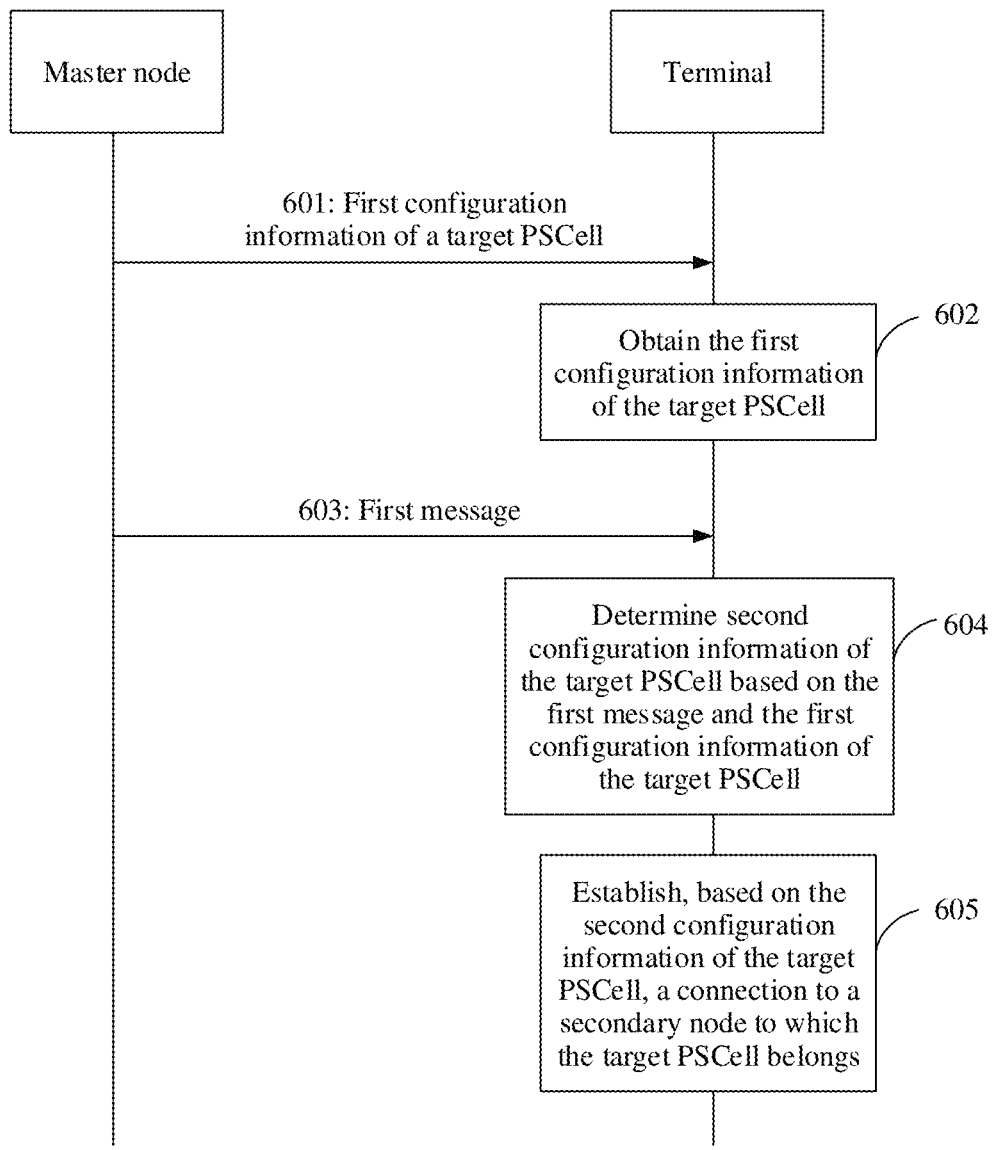
FIG. 6 is a schematic flowchart 4 of a communication method according to an embodiment of this application.

FIG. 6 shows a communication method according to an embodiment of this application. A master node may configure one or more candidate PSCells for a terminal, and send configuration information of the one or more candidate PSCells to the terminal. Subsequently, if the master node adds a target PSCell in the one or more candidate PSCells for the terminal, the master node may indicate the target PSCell to the terminal by using an identifier of the target PSCell or a delta configuration of the target PSCell. The method in this example embodiment includes step 601 to step 605.

Step 601: The master node sends first configuration information of the target PSCell to the terminal.

The master node may be the network device 101 or the network device 102 in FIG. 1, or the master node may be a component in the network device 101 or the network device 102 in FIG. 1. For example, the master node may be a processor in the network device 101 or the network device 102 in FIG. 1, a chip in the network device 101 or the network device 102 in FIG. 1, or a chip system in the network device 101 or the network device 102 in FIG. 1. This is not limited.

The terminal may be the terminal 103 or the terminal 104 in FIG. 1, or the terminal may be a component in the terminal 103 or the terminal 104 in FIG. 1. For example, the terminal may be a processor in the terminal 103 or the terminal 104 in FIG. 1, a chip in the terminal 103 or the terminal 104 in FIG. 1, or a chip system in the terminal 103 or the terminal 104. This is not limited.

The first configuration information of the target PSCell includes configuration information of the target PSCell that is used when the master node configures the target PSCell as a candidate PSCell for the terminal. The configuration information of the target PSCell includes an addition/change condition and a configuration of the target PSCell.

Optionally, the target PSCell is included in a PSCell list, and the PSCell list includes one or more candidate PSCells configured by the master node for the terminal.

Optionally, the master node sends first configuration information of the candidate PSCell in the PSCell list to the terminal. The first configuration information of the candidate PSCell includes the first configuration information of the target PSCell.

Optionally, before step 601, the master node obtains the first configuration information of the candidate PSCell in the PSCell list. For example, for a third candidate node to which any candidate PSCell in the PSCell list belongs, the master node sends a conditional secondary node addition request message to the third candidate node. After receiving the conditional secondary node addition request message, the third candidate node may acknowledge the conditional secondary node addition request message, or may reject the request. If the third candidate node acknowledges the conditional secondary node addition request message, the third candidate node sends an addition request acknowledgment message to the master node, where the addition request acknowledgment message includes the first configuration information of the candidate PSCell in the PSCell list. After receiving the addition request acknowledgment message, the master node may send the first configuration information of the candidate PSCell in the PSCell list to the terminal, and receive a verification complete message from the terminal. For example descriptions of a process in which the master node obtains the first configuration information of the candidate PSCell in the PSCell list, refer to the process in which the first master node obtains the first configuration information in step 301. Details are not described again.

Step 602: The terminal obtains the first configuration information of the target PSCell.

Optionally, the terminal receives and stores the first configuration information of the target PSCell from the master node. When the master node determines the target PSCell as a PSCell for the terminal, the terminal obtains the first configuration information of the target PSCell locally; or the terminal receives and stores the first configuration information of the candidate PSCell in the PSCell list from the master node, and when the master node determines the target PSCell as a PSCell for the terminal, the terminal obtains the first configuration information of the target PSCell locally.

Step 603: The master node sends a first message to the terminal.

The first message may be used to indicate the master node to add the target PSCell for the terminal. The first message may include the identifier of the target PSCell or an identifier of an SCG to which the target PSCell belongs; or the first message may include the identifier of the target PSCell or an identifier of an SCG to which the target PSCell belongs, and the delta configuration of the target PSCell; or the first message includes an identifier of configuration information of the target PSCell and the delta configuration of the target PSCell. The delta configuration includes different configuration information in second configuration information of the target PSCell and the first configuration information of the target PSCell. The second configuration information includes configuration information of the target PSCell that is used when the master node determines the target PSCell as a PSCell for the terminal.

For example, if the master node determines the target PSCell as a PSCell for the terminal, the second configuration information of the target PSCell is the same as the first configuration information of the target PSCell, and the first message includes the identifier of the target PSCell or the identifier of the SCG to which the target PSCell belongs, or another identifier used to indicate the target PSCell. If the second configuration information of the target PSCell is different from the first configuration information of the target PSCell, the first message includes the identifier of the target PSCell or the identifier of the SCG to which the target PSCell belongs, and the delta configuration of the target PSCell, or the first message includes the identifier of the configuration information of the target PSCell and the delta configuration of the target PSCell.

Optionally, before step 603, the master node adds the target PSCell for the terminal. For example, the master node sends an SN addition request message to a node to which the target PSCell belongs, and receives an SN addition request acknowledgment message from the node to which the target PSCell belongs.

The SN addition request message may be used to request to add the target PSCell as a PSCell of the terminal. The SN addition request acknowledgment message is used to indicate, to the node to which the target PSCell belongs, that the master node determines to add the target PSCell for the terminal. If the second configuration information of the target PSCell is different from the first configuration information of the target PSCell, the SN addition request acknowledgment message includes the delta configuration of the target PSCell.

Step 604: The terminal receives the first message from the master node, and determines the second configuration information of the target PSCell based on the first message and the first configuration information of the target PSCell.

Optionally, if the first message includes the identifier of the target PSCell or the identifier of the SCG to which the target PSCell belongs, the terminal determines the first configuration information corresponding to the identifier of the target PSCell or the identifier of the SCG to which the target PSCell belongs as the second configuration information of the target PSCell.

Optionally, if the first message includes the identifier of the target PSCell or the identifier of the SCG to which the target PSCell belongs, and the delta configuration of the target PSCell, the terminal determines the second configuration information of the target PSCell based on the first configuration information of the target PSCell and the delta configuration of the target PSCell.

Step 605: The terminal establishes, based on the second configuration information of the target PSCell, a connection to a secondary node to which the target PSCell belongs.

Optionally, the terminal initiates, based on the second configuration information of the target PSCell, random access to the secondary node to which the target PSCell belongs.

Based on the method shown in FIG. 6, after adding the target PSCell in the PSCell list for the terminal, the master node may not need to send the second configuration information of the target PSCell to the terminal, but sends the first message to the terminal. A size of the identifier or the delta configuration included in the first message is less than a size of the second configuration information of the target PSCell. Therefore, air interface overheads are reduced.

The foregoing mainly describes the solutions provided in embodiments of this application from a perspective of interaction between network elements. It may be understood that, to implement the foregoing functions, the terminal, the first master node, the second master node, the first candidate secondary node, or the like includes a corresponding hardware structure and/or software module for performing each function. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the terminal, the first master node, the second master node, or the first candidate secondary node may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely logical function division. During actual implementation, another division manner may be used.

Figure 7:
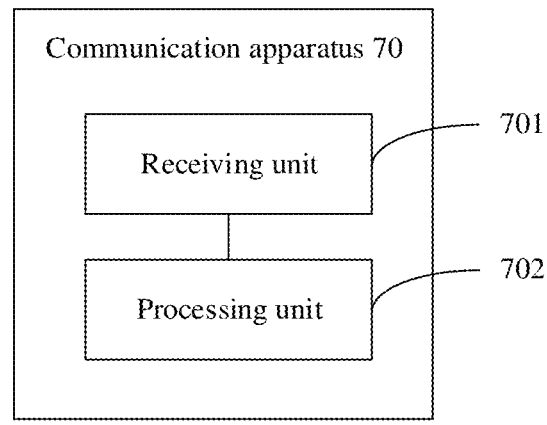
FIG. 7 is a schematic diagram 1 of a structure of a communication apparatus according to an embodiment of this application.

For example, when each functional module is obtained through division in an integrated manner, FIG. 7 is a schematic diagram of a structure of a communication apparatus 70. The communication apparatus 70 may be a terminal, a chip or a system on chip in the terminal, or another combined component, another component, or the like that can implement a function of the foregoing terminal. The communication apparatus 70 may be configured to perform the function of the terminal in the foregoing embodiments.

In a possible implementation, the communication apparatus 70 shown in FIG. 7 includes a receiving unit 701 and a processing unit 702.

The receiving unit 701 is configured to receive a first message from a first master node, where the first message includes an identifier of a first candidate primary secondary cell PSCell that is included in both a first PSCell list and a second PSCell list, or an identifier of configuration information of the first candidate PSCell that is included in both the first PSCell list and the second PSCell list, or delta configuration information of a candidate PSCell in the second PSCell list, the configuration information of the first candidate PSCell includes an addition/change condition and a configuration of the first candidate PSCell, the first PSCell list includes one or more candidate PSCells configured by the first master node for the communication apparatus, and the second PSCell list includes one or more candidate PSCells configured by a second master node for the communication apparatus.

The processing unit 702 is configured to add a target PSCell or change from an original PSCell to the target PSCell based on the first message and first configuration information, where the first configuration information includes an addition/change condition and a configuration of the candidate PSCell in the first PSCell list, the target PSCell is a PSCell in the second PSCell list, and the original PSCell is a PSCell to which the communication apparatus is connected before the communication apparatus is handed over from the first master node to the second master node.

Optionally, the delta configuration information includes different configuration information in configuration information of a same candidate PSCell configured by the second master node and the first master node for the communication apparatus, and/or configuration information of each candidate PSCell other than the first candidate PSCell in the second PSCell list, and/or an identifier of configuration information of a candidate PSCell that is in the first PSCell list and that the second master node determines to release.

Optionally, the processing unit 702 is configured to determine second configuration information based on the first message and the first configuration information, where the second configuration information includes an addition/change condition and a configuration of the candidate PSCell in the second PSCell list. The processing unit 702 is further configured to add a PSCell that meets the addition/change condition of the candidate PSCell in the second PSCell list as the target PSCell or change from the original PSCell to the target PSCell based on the second configuration information.

Optionally, the first message includes delta configuration information of the candidate PSCell in the second PSCell list; and the processing unit 702 is further configured to determine the second configuration information based on the delta configuration information and the first configuration information.

Optionally, the first message includes the identifier of the first candidate PSCell or the identifier of the configuration information of the first candidate PSCell; and the processing unit 702 is further configured to determine the first configuration information corresponding to the identifier of the first candidate PSCell or the identifier of the configuration information of the first candidate PSCell as the second configuration information.

Optionally, the first configuration information further includes configuration information of the original PSCell, and the delta configuration information includes configuration information that is of any candidate PSCell in the second PSCell list and that is different from the configuration information of the original PSCell.

All related content of the operations in the foregoing method embodiments may be cited in function descriptions of the corresponding functional modules. Details are not described herein again.

In this embodiment, the communication apparatus 70 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 70 may be in the form shown in FIG. 2.

For example, the processor 201 in FIG. 2 may invoke the computer-executable instructions stored in the memory 203, to enable the communication apparatus 70 to perform the communication method in the foregoing method embodiments.

For example, functions/implementation processes of the receiving unit 701 and the processing unit 702 in FIG. 7 may be implemented by the processor 201 in FIG. 2 by invoking the computer-executable instructions stored in the memory 203. Alternatively, functions/implementation processes of the processing unit 702 in FIG. 7 may be implemented by the processor 201 in FIG. 2 by invoking the computer-executable instructions stored in the memory 203, and functions/implementation processes of the receiving unit 701 in FIG. 7 may be implemented by the communication interface 204 in FIG. 2.

The communication apparatus 70 provided in this embodiment can perform the foregoing communication method. Therefore, for technical effects that can be achieved by the communication apparatus 70, refer to the foregoing method embodiments. Details are not described herein again.

Figure 8:
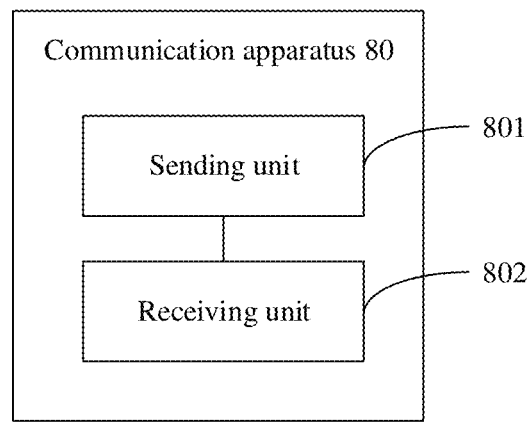
FIG. 8 is a schematic diagram 2 of a structure of a communication apparatus according to an embodiment of this application.

For example, when each functional module is obtained through division in an integrated manner, FIG. 8 is a schematic diagram of a structure of a communication apparatus 80. The communication apparatus 80 may be a first master node, a chip or a system on chip in the first master node, or another combined component, another component, or the like that can implement a function of the foregoing first master node. The communication apparatus 80 may be configured to perform the function of the first master node in the foregoing embodiments.

In a possible implementation, the communication apparatus 80 shown in FIG. 8 includes a sending unit 801 and a receiving unit 802.

The sending unit 801 is configured to send a second message to a second master node, where the second message is used to indicate first configuration information of a candidate primary secondary cell PSCell in a first PSCell list, the first configuration information includes an addition/change condition and a configuration of the candidate PSCell in the first PSCell list, the first PSCell list includes one or more candidate PSCells configured by the communication apparatus for a terminal, and the second master node is a target master node to which the terminal is handed over.

The receiving unit 802 is configured to receive a third message from the second master node, where the third message is obtained based on the second message, the third message includes an identifier of a first candidate PSCell that is included in both the first PSCell list and a second PSCell list, or an identifier of configuration information of the first candidate PSCell that is included in both the first PSCell list and the second PSCell list, or delta configuration information of a candidate PSCell in the second PSCell list, the configuration information of the first candidate PSCell includes an addition/change condition and a configuration of the first candidate PSCell, and the second PSCell list includes one or more candidate PSCells configured by the second master node for the terminal.

The sending unit 801 is further configured to send a first message to the terminal based on the third message, where the first message includes the identifier of the first candidate PSCell, or the identifier of the configuration information of the first candidate PSCell, or the delta configuration information of the candidate PSCell in the second PSCell list.

Optionally, the delta configuration information includes different configuration information in configuration information of a same candidate PSCell configured by the second master node and the communication apparatus for the terminal, and/or configuration information of each candidate PSCell other than the first candidate PSCell in the second PSCell list, and/or an identifier of configuration information of a candidate PSCell that is in the first PSCell list and that the second master node determines to release.

Optionally, the sending unit 801 is further configured to send a first release request message to a node to which each candidate PSCell in the first PSCell list belongs, where the first release request message is used to request to release each candidate PSCell in the first PSCell list.

Optionally, when the first PSCell list includes the first candidate PSCell, the first release request message is further used to indicate a node to which the first candidate PSCell belongs to retain a context with the terminal.

Optionally, the second message includes configuration information of the candidate PSCell in the first PSCell list; the second message includes an identifier of the candidate PSCell in the first PSCell list; or the second message includes an identifier of a secondary cell group to which the candidate PSCell in the first PSCell list belongs.

Optionally, the second message further includes an identifier of an original PSCell, and the original PSCell is a PSCell to which the terminal is connected before the terminal is handed over from the communication apparatus to the second master node.

Optionally, the delta configuration information includes configuration information that is of any candidate PSCell in the second PSCell list and that is different from configuration information of the original PSCell.

All related content of the operations in the foregoing method embodiments may be cited in function descriptions of the corresponding functional modules. Details are not described herein again.

In embodiments, the communication apparatus 80 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 80 may be in the form shown in FIG. 2.

For example, the processor 201 in FIG. 2 may invoke the computer-executable instructions stored in the memory 203, to enable the communication apparatus 80 to perform the communication method in the foregoing method embodiments.

For example, functions/implementation processes of the sending unit 801 and the receiving unit 802 in FIG. 8 may be implemented by the processor 201 in FIG. 2 by invoking the computer-executable instructions stored in the memory 203. Alternatively, functions/implementation processes of the sending unit 801 and the receiving unit 802 in FIG. 8 may be implemented by the communication interface 204 in FIG. 2.

The communication apparatus 80 provided in this embodiment can perform the foregoing communication method. Therefore, for technical effects that can be achieved by the communication apparatus 80, refer to the foregoing method embodiments. Details are not described herein again.

Figure 9:
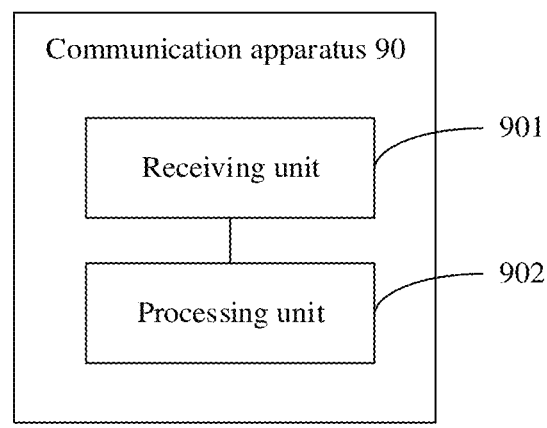
FIG. 9 is a schematic diagram 3 of a structure of a communication apparatus according to an embodiment of this application.

For example, when each functional module is obtained through division in an integrated manner, FIG. 9 is a schematic diagram of a structure of a communication apparatus 90. The communication apparatus 90 may be a second master node, a chip or a system on chip in the second master node, or another combined component, another component, or the like that can implement a function of the foregoing second master node. The communication apparatus 90 may be configured to perform the function of the second master node in the foregoing embodiments.

In a possible implementation, the communication apparatus 90 shown in FIG. 9 includes a receiving unit 901 and a processing unit 902.

The receiving unit 901 is configured to receive a second message from a first master node, where the second message is used to indicate first configuration information of a candidate primary secondary cell PSCell in a first PSCell list, the first configuration information includes an addition/change condition and a configuration of the candidate PSCell in the first PSCell list, the first PSCell list includes one or more candidate PSCells configured by the first master node for a terminal, and the communication apparatus is a target master node to which the terminal is handed over.

The processing unit 902 is configured to determine, based on the second message, that the first master node configures a conditional PSCell addition/change function for the terminal, and send a third message to the first master node, where the third message includes an identifier of a first candidate PSCell that is included in both the first PSCell list and a second PSCell list, or an identifier of configuration information of the first candidate PSCell that is included in both the first PSCell list and the second PSCell list, or delta configuration information of a candidate PSCell in the second PSCell list, the configuration information of the first candidate PSCell includes an addition/change condition and a configuration of the first candidate PSCell, and the second PSCell list includes one or more candidate PSCells configured by the communication apparatus for the terminal.

Optionally, the delta configuration information includes different configuration information in configuration information of a same candidate PSCell configured by the communication apparatus and the first master node for the terminal, and/or configuration information of each candidate PSCell other than the first candidate PSCell in the second PSCell list, and/or an identifier of configuration information of a candidate PSCell that is in the first PSCell list and that the second master node determines to release.

Optionally, the second message includes configuration information of the candidate PSCell in the first PSCell list; the second message includes an identifier of the candidate PSCell in the first PSCell list; or the second message includes an identifier of a secondary cell group to which the candidate PSCell in the first PSCell list belongs.

Optionally, the second message further includes an identifier of an original PSCell, and the original PSCell is a PSCell to which the terminal is connected before the terminal is handed over from the first master node to the communication apparatus.

Optionally, the delta configuration information includes configuration information that is of any candidate PSCell in the second PSCell list and that is different from configuration information of the original PSCell.

All related content of the operations in the foregoing method embodiments may be cited in function descriptions of the corresponding functional modules. Details are not described herein again.

In embodiments, the communication apparatus 90 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 90 may be in the form shown in FIG. 2.

For example, the processor 201 in FIG. 2 may invoke the computer-executable instructions stored in the memory 203, to enable the communication apparatus 90 to perform the communication method in the foregoing method embodiments.

For example, functions/implementation processes of the receiving unit 901 and the processing unit 902 in FIG. 9 may be implemented by the processor 201 in FIG. 2 by invoking the computer-executable instructions stored in the memory 203. Alternatively, functions/implementation processes of the processing unit 902 in FIG. 9 may be implemented by the processor 201 in FIG. 2 by invoking the computer-executable instructions stored in the memory 203, and functions/implementation processes of the receiving unit 901 in FIG. 9 may be implemented by the communication interface 204 in FIG. 2.

The communication apparatus 90 provided in this embodiment can perform the foregoing communication method. Therefore, for technical effects that can be achieved by the communication apparatus 90, refer to the foregoing method embodiments. Details are not described herein again.

Figure 10:
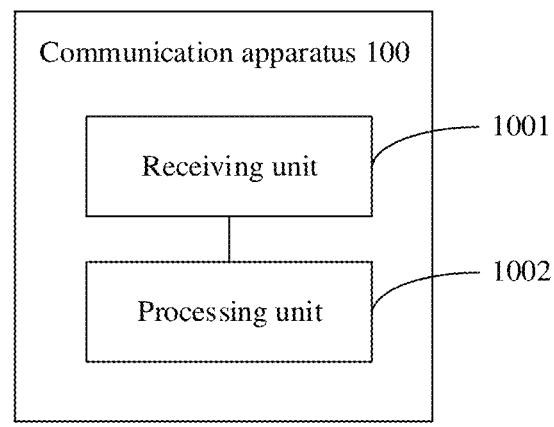
FIG. 10 is a schematic diagram 4 of a structure of a communication apparatus according to an embodiment of this application.

For example, when each functional module is obtained through division in an integrated manner, FIG. 10 is a schematic diagram of a structure of a communication apparatus 100. The communication apparatus 100 may be a first candidate secondary node, a chip or a system on chip in the first candidate secondary node, or another combined component, another component, or the like that can implement a function of the foregoing first candidate secondary node. The communication apparatus 100 may be configured to perform the function of the first candidate secondary node in the foregoing embodiments.

In a possible implementation, the communication apparatus 100 shown in FIG. 10 includes a receiving unit 1001 and a processing unit 1002.

The receiving unit 1001 is configured to receive a first release request message from a first master node, where the first release request message is used to request to release a PSCell configured by the communication apparatus for the first master node, and is used to indicate the communication apparatus to retain a context with a terminal, the communication apparatus is a node to which a first candidate PSCell that is included in both a first PSCell list and a second PSCell list belongs, the first PSCell list includes one or more candidate PSCells configured by the first master node for the terminal, the second PSCell list includes one or more candidate PSCells configured by a second master node for the terminal, and the second master node is a target master node to which the terminal is handed over.

The processing unit 1002 is configured to release, based on the first release request message, the PSCell configured by the communication apparatus for the first master node, and retain the context between the communication apparatus and the terminal.

Optionally, the first release request message includes an identifier of the communication apparatus or an identifier of the PSCell of the communication apparatus.

All related content of the operations in the foregoing method embodiments may be cited in function descriptions of the corresponding functional modules. Details are not described herein again.

In this embodiment, the communication apparatus 100 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 100 may be in the form shown in FIG. 2.

For example, the processor 201 in FIG. 2 may invoke the computer-executable instructions stored in the memory 203, to enable the communication apparatus 100 to perform the communication method in the foregoing method embodiments.

For example, functions/implementation processes of the receiving unit 1001 and the processing unit 1002 in FIG. 10 may be implemented by the processor 201 in FIG. 2 by invoking the computer-executable instructions stored in the memory 203. Alternatively, functions/implementation processes of the processing unit 1002 in FIG. 10 may be implemented by the processor 201 in FIG. 2 by invoking the computer-executable instructions stored in the memory 203, and functions/implementation processes of the receiving unit 1001 in FIG. 10 may be implemented by the communication interface 204 in FIG. 2.

The communication apparatus 100 provided in this embodiment can perform the foregoing communication method. Therefore, for technical effects that can be achieved by the communication apparatus 100, refer to the foregoing method embodiments. Details are not described herein again.

Figure 11:
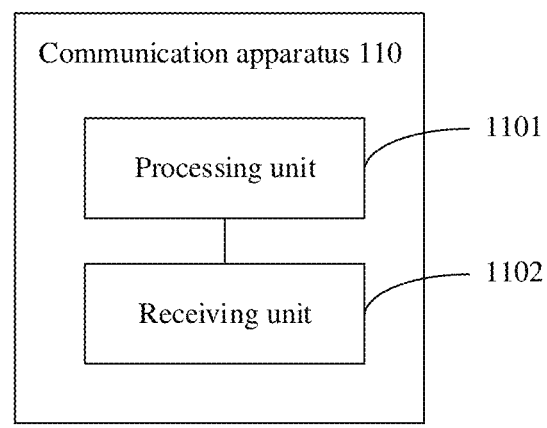
FIG. 11 is a schematic diagram 5 of a structure of a communication apparatus according to an embodiment of this application.

For example, when each functional module is obtained through division in an integrated manner, FIG. 11 is a schematic diagram of a structure of a communication apparatus 110. The communication apparatus 110 may be a terminal, a chip or a system on chip in the terminal, or another combined component, another component, or the like that can implement a function of the foregoing terminal. The communication apparatus 110 may be configured to perform the function of the terminal in the foregoing embodiments.

In a possible implementation, the communication apparatus 110 shown in FIG. 11 includes a processing unit 1101 and a receiving unit 1102.

The processing unit 1101 is configured to obtain first configuration information of a target PSCell, where the first configuration information includes configuration information of the target PSCell that is used when a master node configures the target PSCell as a candidate PSCell for the terminal. The receiving unit 1102 is configured to receive a first message from the master node, where the first message includes an identifier of the target PSCell or an identifier of a secondary cell group to which the target PSCell belongs. The processing unit 1101 is further configured to determine second configuration information of the target PSCell based on the first message and the first configuration information, where the second configuration information includes configuration information of the target PSCell that is used when the master node determines the target PSCell as a PSCell for the terminal. The processing unit 1101 is further configured to establish, based on the second configuration information, a connection to a secondary node to which the target PSCell belongs.

Optionally, if the second configuration information is different from the first configuration information, the first message further includes a delta configuration of the target PSCell, and the delta configuration includes different configuration information in the first configuration information and the second configuration information.

All related content of the operations in the foregoing method embodiments may be cited in function descriptions of the corresponding functional modules. Details are not described herein again.

In this embodiment, the communication apparatus 110 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 110 may be in the form shown in FIG. 2.

For example, the processor 201 in FIG. 2 may invoke the computer-executable instructions stored in the memory 203, to enable the communication apparatus 110 to perform the communication method in the foregoing method embodiments.

For example, functions/implementation processes of the processing unit 1101 and the receiving unit 1102 in FIG. 11 may be implemented by the processor 201 in FIG. 2 by invoking the computer-executable instructions stored in the memory 203. Alternatively, functions/implementation processes of the processing unit 1101 in FIG. 11 may be implemented by the processor 201 in FIG. 2 by invoking the computer-executable instructions stored in the memory 203, and functions/implementation processes of the receiving unit 1102 in FIG. 11 may be implemented by the communication interface 204 in FIG. 2.

The communication apparatus 110 provided in this embodiment can perform the foregoing communication method. Therefore, for technical effects that can be achieved by the communication apparatus 110, refer to the foregoing method embodiments. Details are not described herein again.

Figure 12:
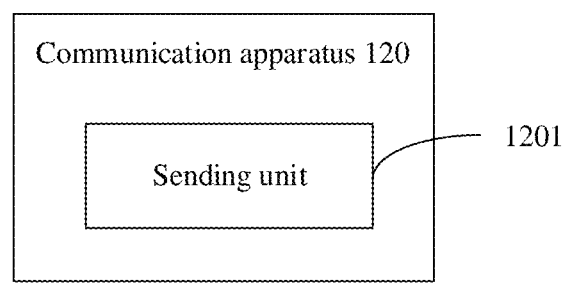
FIG. 12 is a schematic diagram 6 of a structure of a communication apparatus according to an embodiment of this application.

For example, when each functional module is obtained through division in an integrated manner, FIG. 12 is a schematic diagram of a structure of a communication apparatus 120. The communication apparatus 120 may be a master node, a chip or a system on chip in the master node, or another combined component, another component, or the like that can implement a function of the foregoing master node. The communication apparatus 120 may be configured to perform the function of the master node in the foregoing embodiments.

In a possible implementation, the communication apparatus 120 shown in FIG. 12 includes a sending unit 1201.

The sending unit 1201 is configured to send first configuration information of a target PSCell to a terminal, where the first configuration information includes configuration information of the target PSCell that is used when the master node configures the target PSCell as a candidate PSCell for the terminal. The sending unit 1201 is further configured to send a first message to the terminal, where the first message includes an identifier of the target PSCell or an identifier of a secondary node to which the target PSCell belongs, the first message is used with the first configuration information to determine second configuration information of the target PSCell, and the second configuration information includes configuration information of the target PSCell that is used when the master node determines the target PSCell as a PSCell for the terminal.

Optionally, if the second configuration information is different from the first configuration information, the first message further includes a delta configuration of the target PSCell, and the delta configuration includes different configuration information in the first configuration information and the second configuration information.

All related content of the operations in the foregoing method embodiments may be cited in function descriptions of the corresponding functional modules. Details are not described herein again.

In this embodiment, the communication apparatus 120 is presented in a form of functional modules obtained through division in an integrated manner. The module herein may be an ASIC, a circuit, a processor that executes one or more software or firmware programs, a memory, an integrated logic circuit, and/or another component capable of providing the foregoing function. In a simple embodiment, a person skilled in the art may figure out that the communication apparatus 120 may be in the form shown in FIG. 2.

For example, the processor 201 in FIG. 2 may invoke the computer-executable instructions stored in the memory 203, to enable the communication apparatus 120 to perform the communication method in the foregoing method embodiments.

For example, functions/implementation processes of the sending unit 1201 in FIG. 12 may be implemented by the processor 201 in FIG. 2 by invoking the computer-executable instructions stored in the memory 203. Alternatively, functions/implementation processes of the sending unit 1201 in FIG. 12 may be implemented by the communication interface 204 in FIG. 2.

The communication apparatus 120 provided in this embodiment can perform the foregoing communication method. Therefore, for technical effects that can be achieved by the communication apparatus 120, refer to the foregoing method embodiments. Details are not described herein again.

Figure 13:
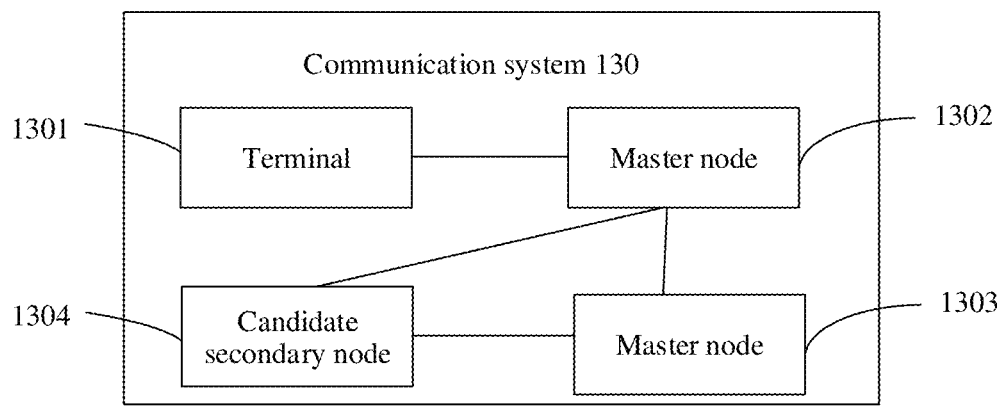
FIG. 13 is a schematic diagram 1 of composition of a communication system according to an embodiment of this application.

FIG. 13 is a schematic diagram of composition of a communication system 130. As shown in FIG. 13, the communication system 130 may include a terminal 1301, a master node 1302, a master node 1303, and a candidate secondary node 1304. It should be noted that FIG. 13 is merely an example accompanying drawing, and network elements included in the communication system 130 shown in FIG. 13 and a quantity of the network elements are not limited in this embodiment of this application.

The terminal 1301 has a function of the communication apparatus 70 shown in FIG. 7, and may be configured to receive a first message of the master node 1302, and add a target PSCell or change from an original PSCell to the target PSCell based on the first message and first configuration information.

The master node 1302 has a function of the communication apparatus 80 shown in FIG. 8, and may be configured to: send a second message to the master node 1303, receive a third message from the master node 1303, and send the first message to the terminal 1301 based on the third message.

The master node 1303 has a function of the communication apparatus 90 shown in FIG. 9, and may be configured to: receive the second message from the master node 1302, determine, based on the second message, that the master node 1302 configures a conditional PSCell addition/change function for the terminal 1301, and send the third message to the master node 1302.

The candidate secondary node 1304 has a function of the communication apparatus 100 shown in FIG. 10, and may be configured to: receive a first release request message from the master node 1302, release, based on the first release request message, a PSCell configured by the candidate secondary node 1304 for the master node 1302, and retain a context between the candidate secondary node 1304 and the terminal 1301.

It should be noted that all related content of the steps in the foregoing method embodiments may be cited in function descriptions of corresponding network elements in the communication system 130. Details are not described herein again.

Figure 14:
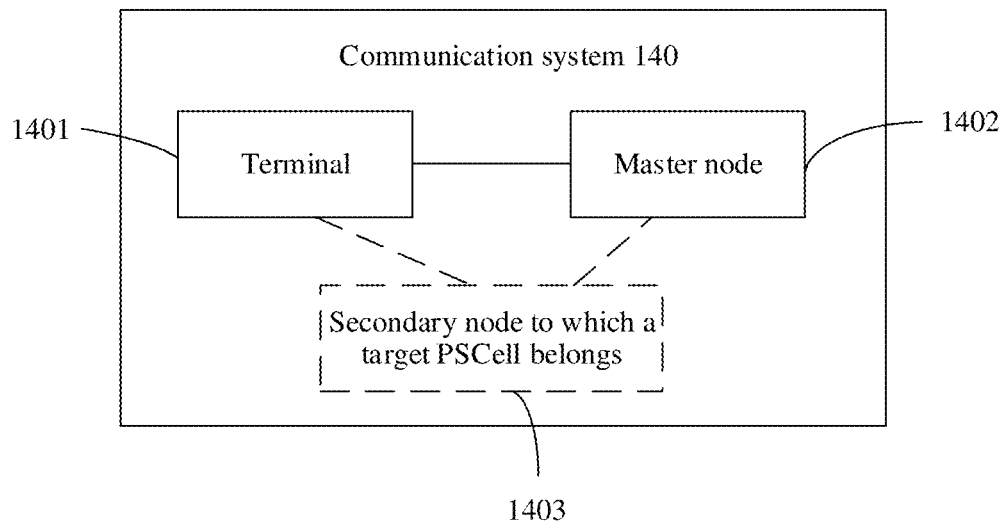
FIG. 14 is a schematic diagram 2 of composition of a communication system according to an embodiment of this application.

FIG. 14 is a schematic diagram of composition of a communication system. As shown in FIG. 14, the communication system 140 may include a terminal 1401 and a master node 1402. It should be noted that FIG. 14 is merely an example accompanying drawing, and network elements included in the communication system 140 shown in FIG. 14 and a quantity of the network elements are not limited in this embodiment of this application.

The terminal 1401 has a function of the communication apparatus 110 shown in FIG. 11, and may be configured to: obtain first configuration information of a target PSCell, receive a first message from the master node 1402, determine second configuration information of the target PSCell based on the first message and the first configuration information, and establish, based on the second configuration information, a connection to a secondary node to which the target PSCell belongs.

The master node 1402 has a function of the communication apparatus 120 shown in FIG. 12, and may be configured to send the first configuration information of the target PSCell to the terminal 1401, and send the first message to the terminal 1401.

Optionally, the communication system 140 may further include a secondary node 1403 to which the target PSCell belongs. The secondary node 1403 to which the target PSCell belongs is configured to: when the master node 1402 determines to add the target PSCell for the terminal 1401, establish a connection to the terminal 1401.

It should be noted that all related content of the steps in the foregoing method embodiments may be cited in function descriptions of corresponding network elements in the communication system 140. Details are not described herein again.

Based on the descriptions of the foregoing implementations, a person skilled in the art may clearly understand that, for the purpose of convenient and brief description, division of the foregoing functional modules is merely used as an example for description. During actual application, the foregoing functions may be allocated to different functional modules for implementation according to a requirement, that is, an internal structure of the apparatus is divided into different functional modules to implement all or some of the foregoing described functions.

In the several embodiments provided in this application, it should be understood that the disclosed apparatus and method may be implemented in other manners. For example, the described apparatus embodiment is merely an example. For example, the division into the modules or the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or the communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected according to actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, wherein the method comprises:
    receiving, by a terminal, a first message from a first master node, wherein the first message comprises an identifier of a first candidate primary secondary cell (PSCell) or an identifier of first configuration information of the first candidate PSCell, wherein the first candidate PSCell is comprised in both a first PSCell list and a second PSCell list; or the first message comprises delta configuration information of a second candidate PSCell in the second PSCell list, wherein the first configuration information of the first candidate PSCell comprises an addition/change condition and a configuration of the first candidate PSCell, the first PSCell list comprises one or more candidate PSCells configured by the first master node for the terminal, and the second PSCell list comprises one or more candidate PSCells configured by a second master node for the terminal; and
    adding, by the terminal, a target PSCell or changing from an original PSCell to the target PSCell based on the first message and second configuration information, wherein the second configuration information comprises the addition/change condition and the configuration of the first candidate PSCell in the first PSCell list, the target PSCell is the second PSCell in the second PSCell list, and the terminal is connected to the original PSCell is before the terminal is handed over from the first master node to the second master node.

2. The communication method according to claim 1, wherein
    the delta configuration information comprises different configuration information in configuration information of a same candidate PSCell configured by the second master node and the first master node for the terminal, or configuration information of each candidate PSCell other than the first candidate PSCell in the second PSCell list, or an identifier of configuration information of one of the one or more candidate PSCells that is in the first PSCell list and that the second master node determines to release.

3. The communication method according to claim 1, wherein the adding, by the terminal, the target PSCell or the changing from the original PSCell to the target PSCell based on the first message and the second configuration information comprises:
  determining, by the terminal, third configuration information based on the first message and the second configuration information, wherein the third configuration information comprises an addition/change condition and a configuration of the second candidate PSCell in the second PSCell list; and
  adding, by the terminal, one of the one or more PSCells in the second PSCell list that meets the addition/change condition of the second candidate PSCell as the target PSCell or changing from the original PSCell to the target PSCell based on the third configuration information.

4. The communication method according to claim 3, wherein the first message comprises the delta configuration information of the second candidate PSCell in the second PSCell list; and
  the determining, by the terminal, the third configuration information based on the first message and the second configuration information comprises:
    determining, by the terminal, the third configuration information based on the delta configuration information and the second configuration information.

5. The communication method according to claim 3, wherein the first message comprises the identifier of the first candidate PSCell or the identifier of the first configuration information of the first candidate PSCell; and
  the determining, by the terminal, the third configuration information based on the first message and the second configuration information comprises:
    determining, by the terminal, the second configuration information corresponding to the identifier of the first candidate PSCell or the identifier of the first configuration information of the first candidate PSCell as the third configuration information.

6. The communication method according to claim 1, wherein the second configuration information further comprises configuration information of the original PSCell, and the delta configuration information comprises configuration information that is of any candidate PSCell in the second PSCell list and that is different from the configuration information of the original PSCell.

7. A communication method applied in a communication system including a first master node, and a second master node, wherein the method comprises:
  sending, by the first master node, a first message to the second master node, wherein the first message is used to indicate first configuration information of a first candidate primary secondary cell (PSCell) included in a first PSCell list and a second PSCell list, the first configuration information comprises an addition/change condition and a configuration of the first candidate PSCell in the first PSCell list, the first PSCell list comprises one or more candidate PSCells configured by the first master node for a terminal, and the second master node is a target master node to which the terminal is handed over;
  determining, by the second master node based on the first message, that the first master node configures a conditional PSCell addition/change function for the terminal, and sending a second message to the first master node, wherein the second message comprises an identifier of the first candidate PSCell or an identifier of second configuration information of the first candidate PSCell; or the second message comprises delta configuration information of a second candidate PSCell in the second PSCell list, wherein the second configuration information of the first candidate PSCell comprises the addition/change condition and the configuration of the first candidate PSCell, and the second PSCell list comprises one or more candidate PSCells configured by the second master node for the terminal; and
  sending, by the first master node, a third message to the terminal based on the second message, wherein the third message comprises the identifier of the first candidate PSCell, the identifier of the second configuration information of the first candidate PSCell, or the delta configuration information of the second candidate PSCell in the second PSCell list.

8. The communication method according to claim 7, wherein
  the delta configuration information comprises different configuration information in configuration information of a same candidate PSCell configured by the second master node and the first master node for the terminal, or configuration information of each candidate PSCell other than the first candidate PSCell in the second PSCell list, or an identifier of configuration information of one or more candidate PSCells that is in the first PSCell list and that the second master node determines to release.

9. The communication method according to claim 7, wherein the method further comprises:
  sending, by the first master node, a first release request message to a node to which each candidate PSCell in the first PSCell list belongs, wherein the first release request message is used to request to release each candidate PSCell in the first PSCell list.

10. The communication method according to claim 9, wherein the first PSCell list comprises the first candidate PSCell, and the first release request message is further used to indicate a node to which the first candidate PSCell belongs to retain a context with the terminal.

11. The communication method according to claim 7, wherein
  the first message comprises configuration information of one of the one or more candidate PSCells in the first PSCell list;
  the first message comprises an identifier of the first candidate PSCell in the first PSCell list; or
  the first message comprises an identifier of a secondary cell group to which the first candidate PSCell in the first PSCell list belongs.

12. The communication method according to claim 11, wherein the first message further comprises an identifier of an original PSCell, to which the terminal is connected before the terminal is handed over from the first master node to the second master node.

13. The communication method according to claim 12, wherein the delta configuration information comprises configuration information that is of any candidate PSCell in the second PSCell list and that is different from configuration information of the original PSCell.

14. A communication apparatus, comprising:
  at least one processor; and
  a memory having instructions stored thereon that, when executed by the at least one processor, cause the communication apparatus to:
    receive a first message from a first master node, wherein the first message comprises an identifier of a first candidate primary secondary cell (PSCell) or an identifier of first configuration information of the first candidate PSCell, wherein the first candidate PSCell is comprised in both a first PSCell list and a second PSCell list; or the first message comprises delta configuration information of a second candidate PSCell in the second PSCell list, wherein the first configuration information of the first candidate PSCell comprises an addition/change condition and a configuration of the first candidate PSCell, the first PSCell list comprises one or more candidate PSCells configured by the first master node for the communication apparatus, and the second PSCell list comprises one or more candidate PSCells configured by a second master node for the communication apparatus; and add a target PSCell or change from an original PSCell to the target PSCell based on the first message and second configuration information, wherein the second configuration information comprises the addition/change condition and the configuration of the first candidate PSCell in the first PSCell list, the target PSCell is the second PSCell in the second PSCell list, and the communication apparatus is connected to the original PSCell before the communication apparatus is handed over from the first master node to the second master node.

15. The communication apparatus according to claim 14, wherein the delta configuration information comprises different configuration information in configuration information of a same candidate PSCell configured by the second master node and the first master node for the communication apparatus, and/or configuration information of each candidate PSCell other than the first candidate PSCell in the second PSCell list, and/or an identifier of configuration information of one of the one or more candidate PSCells that is in the first PSCell list and that the second master node determines to release.

16. The communication apparatus according to claim 14, wherein the communication apparatus is caused to add the target PSCell or change from the original PSCell to the target PSCell based on the first message and the second configuration information by:

determining third configuration information based on the first message and the second configuration information, wherein the third configuration information comprises an addition/change condition and a configuration of the second candidate PSCell in the second PSCell list; and adding one of the one or more PSCells in the second PSCell list that meets the addition/change condition of the second candidate PSCell as the target PSCell or changing from the original PSCell to the target PSCell based on the third configuration information.

17. The communication apparatus according to claim 16, wherein the first message comprises the delta configuration information of the second candidate PSCell in the second PSCell list; and the communication apparatus is caused to determine the second configuration information based on the first message and the second configuration information by:

determining the third configuration information based on the delta configuration information and the second configuration information.

18. The communication apparatus according to claim 16, wherein the first message comprises the identifier of the first candidate PSCell or the identifier of the first configuration information of the first candidate PSCell; and the communication apparatus is caused to determine the third configuration information based on the first message and the second configuration information by:

determining the second configuration information corresponding to the identifier of the first candidate PSCell or the identifier of the first configuration information of the first candidate PSCell as the third configuration information.

19. The communication apparatus according to claim 14, wherein the second configuration information further comprises configuration information of the original PSCell, and the delta configuration information comprises configuration information that is of any candidate PSCell in the second PSCell list and that is different from the configuration information of the original PSCell.

* * * * *